United States Patent
Zhang et al.

(10) Patent No.: US 10,635,802 B2
(45) Date of Patent: Apr. 28, 2020

(54) METHOD AND APPARATUS FOR ACCESSING WI-FI NETWORK

(71) Applicant: Huawei Technologies Co., Ltd., Shenzhen (CN)

(72) Inventors: Qinliang Zhang, Shenzhen (CN); Yu Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 198 days.

(21) Appl. No.: 15/558,073

(22) PCT Filed: Apr. 10, 2015

(86) PCT No.: PCT/CN2015/076340
§ 371 (c)(1),
(2) Date: Sep. 13, 2017

(87) PCT Pub. No.: WO2016/161640
PCT Pub. Date: Oct. 13, 2016

(65) Prior Publication Data
US 2018/0101673 A1   Apr. 12, 2018

(51) Int. Cl.
*G06F 21/36* (2013.01)
*H04W 48/08* (2009.01)
(Continued)

(52) U.S. Cl.
CPC ............. *G06F 21/36* (2013.01); *G06F 3/017* (2013.01); *H04W 12/06* (2013.01); *H04W 12/08* (2013.01);
(Continued)

(58) Field of Classification Search
CPC combination set(s) only.
See application file for complete search history.

(56) References Cited

U.S. PATENT DOCUMENTS

2014/0013100 A1* 1/2014 Menzel ............ H04N 21/43637
713/150
2016/0087811 A1* 3/2016 Yin ........................ H04L 12/189
370/312

(Continued)

FOREIGN PATENT DOCUMENTS

CN          102395216 A     3/2012
CN          103425956 A    12/2013
(Continued)

*Primary Examiner* — Khoi V Le
(74) *Attorney, Agent, or Firm* — Leydig, Voit & Mayer, Ltd.

(57) ABSTRACT

A method in the embodiments of the present invention includes: when the wearable device receives an instruction of a user or an electronic device, obtaining, by the wearable device, an image that includes access information of a Wi-Fi network; and analyzing, by the wearable device, the image, obtaining the access information of the Wi-Fi network, and sending the access information of the Wi-Fi network to the electronic device, so that the electronic device accesses the corresponding Wi-Fi network according to the access information of the Wi-Fi network; or sending, by the wearable device, the image to the electronic device, so that the electronic device accesses the corresponding Wi-Fi network according to the image. The present invention is applied to a procedure of accessing a wireless network.

20 Claims, 11 Drawing Sheets

(51) Int. Cl.
*H04W 76/10* (2018.01)
*G06F 3/01* (2006.01)
*H04W 12/06* (2009.01)
*H04W 12/08* (2009.01)
*G06F 1/16* (2006.01)
*H04L 29/06* (2006.01)

(52) U.S. Cl.
CPC ........... *H04W 48/08* (2013.01); *H04W 76/10* (2018.02); *G06F 1/163* (2013.01); *H04L 63/08* (2013.01)

(56) References Cited

U.S. PATENT DOCUMENTS

| | | | | |
|---|---|---|---|---|
| 2016/0249287 | A1* | 8/2016 | Xie | H04L 9/0631 |
| 2017/0347384 | A1* | 11/2017 | Yu | H04W 12/06 |
| 2018/0146372 | A1* | 5/2018 | Teng | H04W 12/06 |

FOREIGN PATENT DOCUMENTS

| | | | |
|---|---|---|---|
| CN | 103442411 | A | 12/2013 |
| CN | 103686426 | A | 3/2014 |
| CN | 104244455 | A | 12/2014 |
| CN | 104333846 | A | 2/2015 |
| CN | 104378801 | A | 2/2015 |
| CN | 104507142 | A | 4/2015 |
| EP | 2495944 | A2 | 9/2012 |
| EP | 2824537 | A1 | 1/2015 |
| KR | 101101611 | B1 | 1/2012 |
| WO | 2013185533 | A1 | 12/2013 |
| WO | 2014044139 | A1 | 3/2014 |

\* cited by examiner

METHOD AND APPARATUS FOR ACCESSING WI-FI NETWORK

CROSS-REFERENCE TO RELATED APPLICATIONS

This application is a national stage application of International Application No. PCT/CN2015/076340, filed on Apr. 10, 2015, which is hereby incorporated by reference in its entirety.

TECHNICAL FIELD

The present invention relates to the field of application of electronic devices, and in particular, to a method and an apparatus for accessing a Wi-Fi network.

BACKGROUND

With development of networks, a wireless network is applied increasingly widely. Especially, in public places such as cafes, hotels, and shopping malls, a wireless network is provided for users to connect to. For example, in the foregoing places, usually a Wi-Fi (Wireless Fidelity, Wireless Fidelity) connection function is provided, so that electronic devices can access networks by means of Wi-Fi.

Currently, a user needs to manually enter Wi-Fi access information before the user accesses a network by means of Wi-Fi. An operation manner in which the Wi-Fi access information is manually entered is relatively complex, and because the Wi-Fi access information is manually entered by the user, the Wi-Fi access information may be entered incorrectly. Therefore, accuracy of entering the Wi-Fi access information is reduced, and an electronic device fails to access the Wi-Fi network.

SUMMARY

Embodiments of the present invention provide a method and an apparatus for accessing a wireless network, to increase accuracy of entering Wi-Fi access information.

According to a first aspect, the present invention provides a method for accessing a Wi-Fi network, including:

when the wearable device receives an instruction of a user or an electronic device, obtaining, by the wearable device, an image that includes access information of a Wi-Fi network; and analyzing, by the wearable device, the image, obtaining the access information of the Wi-Fi network, and sending the access information of the Wi-Fi network to the electronic device, so that the electronic device accesses the corresponding Wi-Fi network according to the access information of the Wi-Fi network; or sending, by the wearable device, the image to the electronic device, so that the electronic device accesses the corresponding Wi-Fi network according to the image.

With reference to the first aspect, in a first possible implementation manner, the access information of the Wi-Fi network includes a Wi-Fi password; or the access information of the Wi-Fi network includes the Wi-Fi password and a name of a current area; or the access information of the Wi-Fi network includes the Wi-Fi password and a Wi-Fi name.

With reference to the first possible implementation manner of the first aspect, in a second possible implementation manner, after the obtaining, by the wearable device, the access information of the Wi-Fi network, and before the sending the access information of the Wi-Fi network to the electronic device, the method includes:

when the access information of the Wi-Fi network includes the Wi-Fi password, but does not include the Wi-Fi name and the name of the current area, obtaining, by the wearable device, the name of the current area by using an indoor positioning technology.

With reference to any one of the first aspect or the first to the second possible implementation manners of the first aspect, in a third possible implementation manner, before the sending, by the wearable device, the access information of the Wi-Fi network to the electronic device, the method further includes:

determining, by the wearable device, whether the access information of the Wi-Fi network includes a confusable number and/or letter; and the sending the access information of the Wi-Fi network to the electronic device includes:

if the access information of the Wi-Fi network includes a confusable number and/or letter, sending, by the wearable device, all access information of the Wi-Fi network that is combined according to the confusable number and/or letter to the electronic device; or if the access information of the Wi-Fi network includes a confusable number and/or letter, combining, by the wearable device, the access information of the Wi-Fi network according to the confusable number and/or letter, and displaying all combined access information of the Wi-Fi network; and receiving, by the wearable device, a selection instruction of the user, and sending access information, determined according to the selection instruction, of the Wi-Fi network to the electronic device.

With reference to any one of the first aspect or the first to the third possible implementation manners of the first aspect, in a fourth possible implementation manner, before the sending, by the wearable device, the Wi-Fi access information to the electronic device, or before the sending, by the wearable device, the image collected by the image collection apparatus to the electronic device, the method further includes:

sending, by the wearable device, a prompt message of whether to access the network, and receiving a response that is entered by the user to determine to access the network.

With reference to any one of the first aspect or the first to the fourth possible implementation manners of the first aspect, in a fifth possible implementation manner, the instruction of the user includes any one or more of the following: a specific speech instruction, a specific gesture instruction, input from a specific key, a specific touching manner, a specific head motion, or a specific eye motion.

With reference to any one of the first aspect or the first to the fifth possible implementation manners of the first aspect, in a sixth possible implementation manner, that the wearable device receives an instruction of the electronic device includes:

receiving, by the wearable device, an instruction that includes the Wi-Fi name and that is sent by the electronic device; and the obtaining, by the wearable device, an image that includes access information of a Wi-Fi network includes:

obtaining, by the wearable device according to the Wi-Fi name, the image that includes the access information of the Wi-Fi network.

With reference to any one of the first aspect or the first to the fifth possible implementation manners of the first aspect, in a seventh possible implementation manner, that the wearable device receives an instruction of the electronic device includes:

receiving, by the wearable device, an instruction that does not include the Wi-Fi name and that is sent by the electronic device; and the obtaining, by the wearable device, an image that includes access information of a Wi-Fi network includes: obtaining, by the wearable device, the image that includes the access information of the Wi-Fi network.

According to a second aspect, the present invention provides a method for accessing a Wi-Fi network, including:

sending, by an electronic device, an image collection instruction to a wearable device, so that the wearable device obtains an image that includes access information of a Wi-Fi network;

receiving, by the electronic device, the access information of the Wi-Fi network sent by the wearable device, where the access information of the Wi-Fi network is obtained by the wearable device by analyzing the image; or receiving, by the electronic device, the image sent by the wearable device, and obtaining the access information of the Wi-Fi network from the image; and connecting, by the electronic device, to the corresponding Wi-Fi network according to the access information of the Wi-Fi network.

With reference to the second aspect, in a first possible implementation manner of the second aspect, before the connecting, by the electronic device, to the corresponding Wi-Fi network according to the access information of the Wi-Fi network, the method further includes:

when the access information of the Wi-Fi network includes the Wi-Fi password, but does not include a Wi-Fi name and a name of a current area, obtaining, by the electronic device, the name of the current area by using an indoor positioning technology, and determining the Wi-Fi name according to the name of the current area; or when the access information of the Wi-Fi network includes the Wi-Fi password and a name of a current area, determining, by the electronic device, the Wi-Fi name according to the name of the current area; and the connecting, by the electronic device, to the corresponding Wi-Fi network according to the access information of the Wi-Fi network includes:

connecting, by the electronic device, to the corresponding Wi-Fi network according to the Wi-Fi password and the Wi-Fi name.

With reference to the second aspect or the first possible implementation manner of the second aspect, in a third possible implementation manner, the connecting, by the electronic device, to the corresponding Wi-Fi network according to the access information of the Wi-Fi network includes:

when the electronic device fails to obtain the Wi-Fi name, sequentially attempting, by the electronic device, to access a Wi-Fi network in descending order of signal strength of found Wi-Fi networks, until the electronic device accesses the Wi-Fi network corresponding to the Wi-Fi password.

With reference to any one of the second aspect or the first to the third possible implementation manners of the second aspect, in a fourth possible implementation manner, after the obtaining, by the electronic device, the access information of the Wi-Fi network from the image, the method further includes:

determining, by the electronic device, whether the access information of the Wi-Fi network includes a confusable number and/or letter; and the connecting, by the electronic device, to the corresponding Wi-Fi network according to the access information of the Wi-Fi network includes:

if the access information of the Wi-Fi network includes a confusable number and/or letter, combining, by the electronic device, the access information of the Wi-Fi network according to the confusable number and/or letter, and displaying combined access information of the Wi-Fi network; and receiving, by the electronic device, a selection instruction of a user, and accessing the corresponding Wi-Fi network according to access information, determined according to the selection instruction, of the Wi-Fi network; or if the access information of the Wi-Fi network includes a confusable number and/or letter, attempting, by the electronic device, sequentially according to all the access information of the Wi-Fi network, to access the corresponding Wi-Fi network.

With reference to any one of the second aspect or the first to the fourth possible implementation manners of the second aspect, in a fifth possible implementation manner, the sending, by an electronic device, an image collection instruction to a wearable device, so that the wearable device obtains an image that includes access information of a Wi-Fi network includes:

when the electronic device finds a Wi-Fi access point, sending, by the electronic device, the image collection instruction to the wearable device, where the image collection instruction includes the Wi-Fi name corresponding to the Wi-Fi access point, so that the wearable device obtains, according to the Wi-Fi name, the image that includes the access information of the Wi-Fi network; or when the electronic device fails to access a saved Wi-Fi access point, sending, by the electronic device, the image collection instruction to the wearable device, where the image collection instruction includes a name of the Wi-Fi access point, so that the wearable device obtains, according to the Wi-Fi name, the image that includes the access information of the Wi-Fi network; or when the electronic device receives an instruction of the user, sending, by the electronic device, the image collection instruction to the wearable device, so that the wearable device obtains the image that includes the access information of the Wi-Fi network.

With reference to any one of the second aspect or the first to the fifth possible implementation manners of the second aspect, in a sixth possible implementation manner, the instruction of the user includes any one or more of the following: a specific speech instruction, a specific gesture instruction, input from a specific key, a specific touching manner, and shaking of the electronic device.

With reference to any one of the second aspect or the first to the fifth possible implementation manners of the second aspect, in a seventh possible implementation manner, before the connecting, by the electronic device, to the corresponding Wi-Fi network according to the access information of the Wi-Fi network, the method further includes:

sending, by the electronic device, a prompt message of whether to access the network, and receiving a response that is entered by the user to determine to access the network.

According to a third aspect, the present invention provides an apparatus for accessing a Wi-Fi network, including:

a first receiving unit, configured to receive an instruction of a user or an electronic device;

an image collection unit, configured to: after the first receiving unit receives the instruction of the user or the instruction of the electronic device, obtain an image that includes access information of a Wi-Fi network;

a first image analysis unit, configured to: analyze the image obtained by the image collection unit, and obtain the access information of the Wi-Fi network; and a sending unit, configured to send the access information of the Wi-Fi network to the electronic device, so that the electronic device accesses the corresponding Wi-Fi network according to the access information of the Wi-Fi network; or configured to send the image to the electronic device, so that the electronic device accesses the corresponding Wi-Fi network according to the image.

With reference to the third aspect, in a first possible implementation manner of the third aspect, the access information of the Wi-Fi network includes a Wi-Fi password; or the access information of the Wi-Fi network includes the Wi-Fi password and a name of a current area; or the access information of the Wi-Fi network includes the Wi-Fi password and a Wi-Fi name.

With reference to the third aspect or the first possible implementation manner of the third aspect, in a second possible implementation manner, the apparatus further includes:

a first obtaining unit, configured to: when the access information of the Wi-Fi network includes the Wi-Fi password, but does not include the Wi-Fi name and the name of the current area, obtain the name of the current area by using an indoor positioning technology.

With reference to the first possible implementation manner of the third aspect or the second possible implementation manner of the third aspect, in a third possible implementation manner, the first image analysis unit further includes:

a first determining subunit, configured to determine whether the access information of the Wi-Fi network includes a confusable number and/or letter; and the sending unit is specifically configured to: if the access information of the Wi-Fi network includes a confusable number and/or letter, send all access information of the Wi-Fi network that is combined according to the confusable number and/or letter to the electronic device.

With reference to the first possible implementation manner or the third possible implementation manner of the third aspect, in a fourth possible implementation manner, the first image analysis unit further includes a first determining subunit, configured to determine whether the access information of the Wi-Fi network includes a confusable number and/or letter;

the apparatus further includes:

a display unit, configured to: if the access information of the Wi-Fi network includes a confusable number and/or letter, combine the access information of the Wi-Fi network according to the confusable number and/or letter, and display all combined access information of the Wi-Fi network; and a second receiving unit, configured to receive a selection instruction of the user; and the sending unit is specifically configured to send access information, determined according to the selection instruction received by the instruction receiving subunit, of the Wi-Fi network to the electronic device.

With reference to any one of the third aspect or the first to the fourth possible implementation manners of the third aspect, in a fifth possible implementation manner, the apparatus further includes:

a first prompt message unit, configured to: before the sending unit sends the Wi-Fi access information or sends the collected image, send a prompt message of whether to access the network, and receive a response that is entered by the user to determine to access the network.

With reference to any one of the third aspect or the first to the fifth possible implementation manners of the third aspect, in a sixth possible implementation manner, the first receiving unit is specifically configured to receive an instruction that includes the Wi-Fi name and that is sent by the electronic device; and the image collection unit is specifically configured to obtain, according to the Wi-Fi name, the image that includes the access information of the Wi-Fi network.

With reference to any one of the third aspect or the first to the fifth possible implementation manners of the third aspect, in a seventh possible implementation manner, the first receiving unit is specifically configured to receive, by the wearable device, an instruction that does not include the Wi-Fi name and that is sent by the electronic device; and the image collection unit is specifically configured to obtain the image that includes the access information of the Wi-Fi network.

According to a fourth aspect, the present invention provides an apparatus for accessing a Wi-Fi network, including:

an instruction sending unit, configured to send an image collection instruction to a wearable device, so that the wearable device obtains an image that includes access information of a Wi-Fi network;

a third receiving unit, configured to receive the access information of the Wi-Fi network sent by the wearable device, where the access information of the Wi-Fi network is obtained by the wearable device by analyzing the image; or configured to receive the image sent by the wearable device;

a second image analysis unit, configured to obtain the access information of the Wi-Fi network from the image received by the receiving unit; and a network connection unit, configured to access the corresponding Wi-Fi network according to the access information of the Wi-Fi network.

With reference to the fourth aspect, in a first possible implementation manner of the fourth aspect, the apparatus further includes:

a second obtaining unit, configured to: when the access information of the Wi-Fi network includes the Wi-Fi password, but does not include a Wi-Fi name and a name of a current area, obtain the name of the current area by using an indoor positioning technology, and determine the Wi-Fi name according to the name of the current area; or when the access information of the Wi-Fi network includes the Wi-Fi password and a name of a current area, determine the Wi-Fi name according to the name of the current area; and the network connection unit is specifically configured to access the corresponding Wi-Fi network according to the Wi-Fi password and the Wi-Fi name.

With reference to the first possible implementation manner of the fourth aspect, in a second possible implementation manner, the network connection unit is specifically configured to: when the receiving unit fails to obtain the Wi-Fi name, sequentially attempt to access a Wi-Fi network in descending order of signal strength of found Wi-Fi networks, until the network connection unit accesses the Wi-Fi network corresponding to the Wi-Fi password.

With reference to any one of the fourth aspect or the first to the second possible implementation manners of the fourth aspect, in a third possible implementation manner, the apparatus further includes:

a determining unit, configured to determine whether the access information of the Wi-Fi network includes a confusable number and/or letter; and a display unit, configured to: if the access information of the Wi-Fi network includes a confusable number and/or letter, combine the access information of the Wi-Fi network according to the confusable number and/or letter, and display combined access information of the Wi-Fi network; and a fourth receiving unit, configured to receive a selection instruction of a user; and the network connection unit is specifically configured to access the corresponding Wi-Fi network according to access information, determined according to the selection instruction, of the Wi-Fi network.

With reference to any one of the fourth aspect or the first to the second possible implementation manners of the fourth aspect, in a fourth possible implementation manner, the apparatus further includes:

a determining unit, configured to determine whether the access information of the Wi-Fi network includes a confusable number and/or letter; and the network connection unit is specifically configured to: if the access information of the Wi-Fi network includes a confusable number and/or letter, attempt, sequentially according to all the access information of the Wi-Fi network, to access the corresponding Wi-Fi network.

With reference to any one of the fourth aspect or the first to the fourth possible implementation manners of the fourth aspect, in a fifth possible implementation manner, the instruction sending unit is specifically configured to: when a Wi-Fi access point is found, send the image collection instruction to the wearable device, where the image collection instruction includes the Wi-Fi name corresponding to the Wi-Fi access point, so that the wearable device obtains, according to the Wi-Fi name, the image that includes the access information of the Wi-Fi network; or the instruction sending unit is configured to: when a saved Wi-Fi access point fails to be connected, send the image collection instruction to the wearable device, where the image collection instruction includes a name of the Wi-Fi access point, so that the wearable device obtains, according to the Wi-Fi name, the image that includes the access information of the Wi-Fi network; or the instruction sending unit is configured to: when the electronic device receives an instruction of the user, send the image collection instruction to the wearable device, so that the wearable device obtains the image that includes the access information of the Wi-Fi network.

With reference to any one of the fourth aspect or the first to the fourth possible implementation manners of the fourth aspect, in a sixth possible implementation manner, the apparatus further includes:

a second prompt message unit, configured to: before the network connection unit accesses the corresponding Wi-Fi network according to the access information of the Wi-Fi network, send a prompt message of whether to access the network, and receive a response that is entered by the user to determine to access the network.

According to a fifth aspect, the present invention provides a wearable device, including:

a receiver, configured to receive an instruction of a user or an electronic device;

an image collection module, configured to: when the receiver receives the instruction of the user or the instruction of the electronic device, obtain an image that includes access information of a Wi-Fi network;

a processor, configured to: analyze the image, and obtain the access information of the Wi-Fi network; and a sender, configured to send the access information of the Wi-Fi network to the electronic device, so that the electronic device accesses the corresponding Wi-Fi network according to the access information of the Wi-Fi network; or configured to send the image to the electronic device, so that the electronic device accesses the corresponding Wi-Fi network according to the image.

With reference to the fifth aspect, in a first possible implementation manner of the fifth aspect, the access information of the Wi-Fi network includes a Wi-Fi password; or the access information of the Wi-Fi network includes the Wi-Fi password and a name of a current area; or the access information of the Wi-Fi network includes the Wi-Fi password and a Wi-Fi name.

With reference to the first possible implementation manner of the fifth aspect, in a second possible implementation manner of the fifth aspect, the processor is further configured to: after obtaining the access information of the Wi-Fi network, if the access information of the Wi-Fi network includes the Wi-Fi password, but does not include the Wi-Fi name and the name of the current area, trigger a positioning unit to obtain the name of the current area; and the wearable device further includes the positioning unit, configured to obtain the name of the current area by using an indoor positioning technology according to the triggering of the processor.

With reference to the first possible implementation manner of the fifth aspect or the second possible implementation manner of the fifth aspect, in a third possible implementation manner of the fifth aspect, the processor is further configured to: before the sender sends the access information of the Wi-Fi network, determine whether the access information of the Wi-Fi network includes a confusable number and/or letter; and the sender is specifically configured to: if the access information of the Wi-Fi network includes a confusable number and/or letter, send all access information of the Wi-Fi network that is combined according to the confusable number and/or letter to the electronic device.

With reference to the first possible implementation manner of the fifth aspect or the second possible implementation manner of the fifth aspect, in a fourth possible implementation manner of the fifth aspect, the processor is further configured to: before the sender sends the access information of the Wi-Fi network, determine whether the access information of the Wi-Fi network includes a confusable number and/or letter, and if the access information of the Wi-Fi network includes a confusable number and/or letter, combine the access information of the Wi-Fi network according to the confusable number and/or letter;

the wearable device further includes:

a display unit, configured to display all combined access information of the Wi-Fi network; and an input unit, configured to receive a selection instruction of a user; and the sender is specifically configured to send access information, determined according to the selection instruction, of the Wi-Fi network to the electronic device.

With reference to any one of the fifth aspect or the first to the fourth possible implementation manners of the fifth aspect, in a fifth possible implementation manner, the wearable device further includes: a prompt message unit, configured to: before the sender sends the Wi-Fi access information or sends the collected image, send a prompt message of whether to access the network; and a response receiving unit, configured to receive a response that is entered by the user to determine to access the network.

With reference to any one of the fifth aspect or the first to the fifth possible implementation manners of the fifth aspect, in a sixth possible implementation manner, the receiver is specifically configured to receive an instruction that includes the Wi-Fi name and that is sent by the electronic device; and the image collection module is specifically configured to obtain, according to the Wi-Fi name, the image that includes the access information of the Wi-Fi network.

With reference to any one of the fifth aspect or the first to the fifth possible implementation manners of the fifth aspect, in a seventh possible implementation manner, the receiver is specifically configured to receive an instruction that does not specify the Wi-Fi name and that is sent by the electronic device; and the image collection module is specifically configured to obtain the image that includes the access information of the Wi-Fi network.

According to a sixth aspect, the present invention provides an electronic device, including:

a sender, configured to send an image collection instruction to a wearable device, so that the wearable device obtains an image that includes access information of a Wi-Fi network;

a receiver, configured to receive the access information of the Wi-Fi network sent by the wearable device, where the access information of the Wi-Fi network is obtained by the wearable device by analyzing the image; or configured to receive the image sent by the wearable device; and a processor, configured to obtain the access information of the Wi-Fi network from the image, or obtain the access information of the Wi-Fi network received by the receiver, where the sender is further configured to access the corresponding Wi-Fi network according to the access information of the Wi-Fi network.

With reference to the sixth aspect, in a first possible implementation manner of the sixth aspect, before the corresponding Wi-Fi network is connected according to the access information of the Wi-Fi network, the processor is further configured to: when the access information of the Wi-Fi network includes the Wi-Fi password, but does not include a Wi-Fi name and a name of a current area, obtain the name of the current area by using an indoor positioning technology, and determine the Wi-Fi name according to the name of the current area; or the processor is further configured to: when the access information of the Wi-Fi network includes the Wi-Fi password and a name of a current area, determine the Wi-Fi name according to the name of the current area; and the sender is specifically configured to access the corresponding Wi-Fi network according to the Wi-Fi password and the Wi-Fi name.

With reference to the first possible implementation manner of the sixth aspect, in a second possible implementation manner of the sixth aspect, the processor is further configured to: when failing to obtain the Wi-Fi name, obtain signal strength of found Wi-Fi networks; and the sender is specifically configured to sequentially attempt to access a Wi-Fi network in descending order of the signal strength of the found Wi-Fi networks, until the sender accesses the Wi-Fi network corresponding to the Wi-Fi password.

With reference to any one of the sixth aspect or the first to the second possible implementation manners of the sixth aspect, in a third possible implementation manner of the sixth aspect, the processor is further configured to: after obtaining the access information of the Wi-Fi network from the image, or obtaining the access information of the Wi-Fi network received by the receiver, determine whether the access information of the Wi-Fi network includes a confusable number and/or letter, and if the access information of the Wi-Fi network includes a confusable number and/or letter, combine the access information of the Wi-Fi network according to the confusable number and/or letter;

the electronic device further includes:

a display, configured to display combined access information of the Wi-Fi network; and an input unit, configured to receive a selection instruction of a user; and the sender is specifically configured to access the corresponding Wi-Fi network according to access information, determined according to the selection instruction, of the Wi-Fi network.

With reference to any one of the sixth aspect or the first to the third possible implementation manners of the sixth aspect, in a fourth possible implementation manner of the sixth aspect, the processor is further configured to: after obtaining the access information of the Wi-Fi network from the image, or obtaining the access information of the Wi-Fi network received by the receiver, determine whether the access information of the Wi-Fi network includes a confusable number and/or letter; and the sender is specifically configured to: if the access information of the Wi-Fi network includes a confusable number and/or letter, attempt, sequentially according to all the access information of the Wi-Fi network, to access the corresponding Wi-Fi network.

With reference to any one of the sixth aspect or the first to the fourth possible implementation manners of the sixth aspect, in a fifth possible implementation manner of the sixth aspect, the sender is specifically configured to: when a Wi-Fi access point is found, send the image collection instruction to the wearable device, where the image collection instruction includes the Wi-Fi name corresponding to the Wi-Fi access point, so that the wearable device obtains, according to the Wi-Fi name, the image that includes the access information of the Wi-Fi network; or the sender is specifically configured to: when a saved Wi-Fi access point fails to be connected, send the image collection instruction to the wearable device, where the image collection instruction includes a name of the Wi-Fi access point, so that the wearable device obtains, according to the Wi-Fi name, the image that includes the access information of the Wi-Fi network; or the sender is specifically configured to: when an instruction of the user is received, send the image collection instruction to the wearable device, so that the wearable device obtains the image that includes the access information of the Wi-Fi network.

With reference to any one of the sixth aspect or the first to the fifth possible implementation manners of the sixth aspect, in a sixth possible implementation manner of the sixth aspect, the electronic device further includes:

the electronic device further includes: a prompt message unit, configured to: before the sender accesses the corresponding Wi-Fi network, send a prompt message of whether to access the network; and a response receiving unit, configured to receive a response that is entered by the user to determine to access the network.

The embodiments of the present invention provide the method and apparatus for accessing a wireless network. First, a wearable device obtains an image that includes access information of a Wi-Fi network. Then, the wearable device or an electronic device analyzes the image, and obtains the access information of the Wi-Fi network in the image. Finally, the electronic device accesses the corresponding Wi-Fi network according to the access information of the Wi-Fi network. In a method in the prior art, a user needs to manually enter Wi-Fi access information to enable an electronic device to access a Wi-Fi network. By comparison, in the present invention, a wearable device obtains Wi-Fi access information, and an electronic device automatically accesses a wireless network according to the Wi-Fi access information. Therefore, an operation of manually entering Wi-Fi access information by a user to connect an electronic device to a network is removed, and an entering error that occurs when the user enters the Wi-Fi access information is avoided. Consequently, accuracy of entering the Wi-Fi access information is increased.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the embodiments of the present invention, a wearable device includes at least: a smart watch, a smart band, smart glasses, and another device on which an image collection apparatus can be installed and that can perform information data transmission to an electronic device.

In the embodiments of the present invention, the electronic device includes at least: a smartphone, a tablet computer (Pad), and another device that can access a network by means of Wi-Fi.

Figure 1:
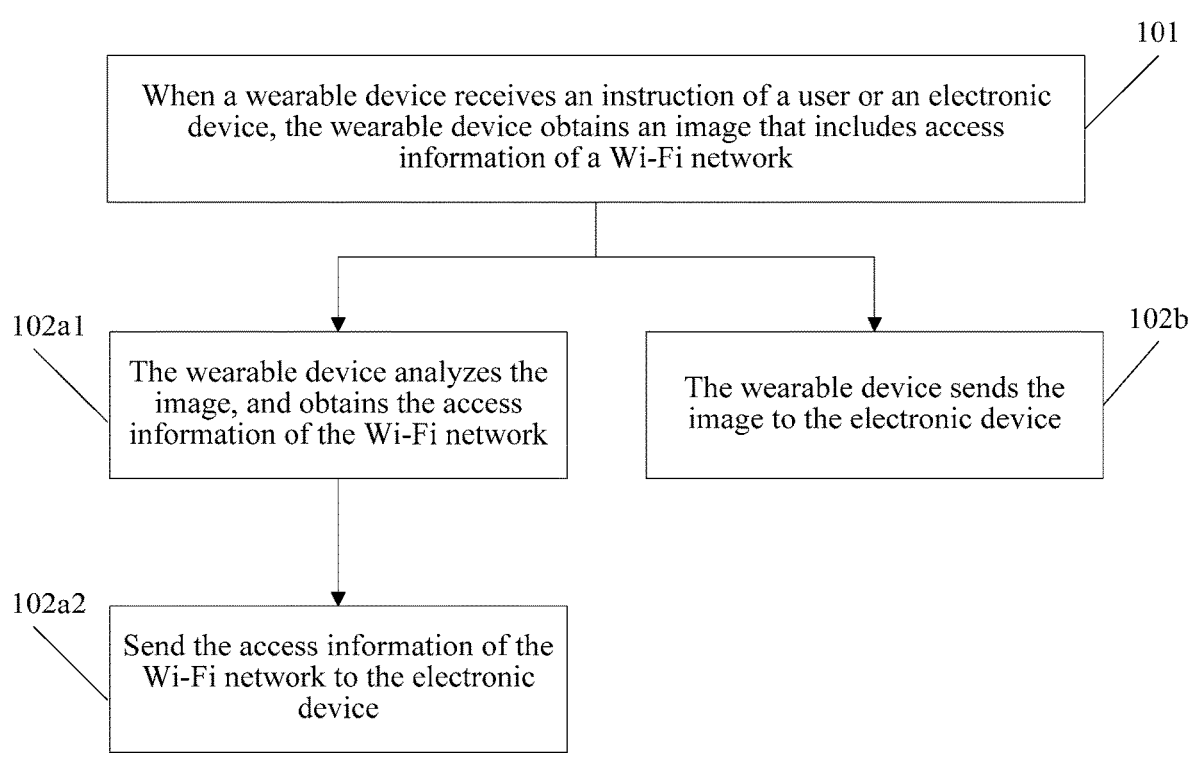
FIG. 1 is a flowchart of a method for accessing a wireless network according to an embodiment of the present invention.

An embodiment of the present invention provides a method for accessing a wireless network. As shown in FIG. 1, the method includes the following steps.

101: When the wearable device receives an instruction of a user or an electronic device, the wearable device obtains an image that includes access information of a Wi-Fi network.

The wearable device obtains, by using an image collection apparatus, the image that includes the access information of the Wi-Fi network.

Optionally, the image collection apparatus may be a camera, a two-dimensional barcode scanning apparatus, a linear barcode scanning apparatus, or the like. Image collection apparatuses that are applicable to the prior art are all applicable to the embodiments of the present invention, and the image collection apparatuses are not described in detail herein. It should be noted that, data transmission may be performed between the wearable device and the electronic device by means of Bluetooth.

102a1: The wearable device analyzes the image, and obtains the access information of the Wi-Fi network.

102a2: Send the access information of the Wi-Fi network to the electronic device, so that the electronic device accesses the corresponding Wi-Fi network according to the access information of the Wi-Fi network.

102b: The wearable device sends the image to the electronic device, so that the electronic device accesses the corresponding Wi-Fi network according to the image.

Step 102a and step 102b are two parallel steps. After step 101 is performed, either step 102a or step 102b may be selected to be performed.

It should be noted that, in step 102a, the wearable device performs image analysis on the collected image, and obtains the Wi-Fi access information from the image. Usually, a shop that provides a Wi-Fi access point marks a Wi-Fi password and a Wi-Fi name. The Wi-Fi name and the Wi-Fi password are marked by using characters such as "Wi-Fi", "password", "name", "SSID", and "password (password)". In this case, the Wi-Fi name and the Wi-Fi password may be accurately recognized by recognizing keywords. A specific image analysis method may be implemented according to an image analysis method in the prior art, and is not limited in this embodiment of the present invention. After obtaining the Wi-Fi access information from the image, the wearable device stores the obtained Wi-Fi access information as text information, and sends the text information to the electronic device. A text format of storing the Wi-Fi access information is not limited in this embodiment.

Optionally, when step 102*a* or step 102*b* is performed, the wearable device may send the Wi-Fi access information or the collected image to the electronic device by using the Bluetooth transmission protocol, but the present invention is not limited to this transmission manner. All other technical means that can implement data transmission between the wearable device and the electronic device may be applied to this embodiment of the present invention.

In another embodiment provided in the present invention, three cases in which the access information of the Wi-Fi network includes different content are described in detail.

In a first case, the access information of the Wi-Fi network includes a Wi-Fi password.

In a second case, the access information of the Wi-Fi network includes the Wi-Fi password and a name of a current area.

In a third case, the access information of the Wi-Fi network includes the Wi-Fi password and a Wi-Fi name.

It should be noted that, the foregoing three cases are parallel, that is, in an actual obtaining process, only one of the foregoing three cases may occur. In subsequent embodiments of the present invention, methods for accessing a Wi-Fi network are provided for the foregoing three different cases, and details are not described herein.

In another embodiment provided in the present invention, a method for obtaining the name of the current area in the first case, that is, when the access information of the Wi-Fi network includes the Wi-Fi password, is provided. The method is performed after the obtaining, by the wearable device, the access information of the Wi-Fi network, and before the sending, by the wearable device, the access information of the Wi-Fi network to the electronic device, and includes:

when the access information of the Wi-Fi network includes the Wi-Fi password, but does not include the Wi-Fi name and the name of the current area, obtaining, by the wearable device, the name of the current area by using an indoor positioning technology.

The Wi-Fi password generally includes multiple numbers, multiple letters, or multiple numbers and letters. Therefore, when an image collection area includes an image having the foregoing characteristic, image recognition is performed on the image, and a character string is obtained from the image. In this case, the character string is probably a Wi-Fi password. If the character string is a Wi-Fi password, a name of a current area is determined by using the indoor positioning technology. It should be noted that, in actual life, names of many Wi-Fi access points are the same as names of areas of the Wi-Fi access points. For example, for an "XX shopping mall", a Wi-Fi name of the shopping mall may also be "XX shopping mall". Therefore, the name of the current area of the user may be determined by using the indoor positioning technology, so as to determine the Wi-Fi name. It should be further noted that after the name of the current area is obtained, the electronic device converts the name of the area into the Wi-Fi name. The Wi-Fi name is generally named by using English letters. For example, it is obtained that a name of a current area is "hotel", and a Wi-Fi name corresponding to "hotel" may be "jiudian" or "hotel". Therefore, the name of the current area needs to be converted. Specifically, the electronic device performs search and conversion on the name of the current area by using the Internet, or performs conversion by using information stored in the electronic device.

Figure 2:
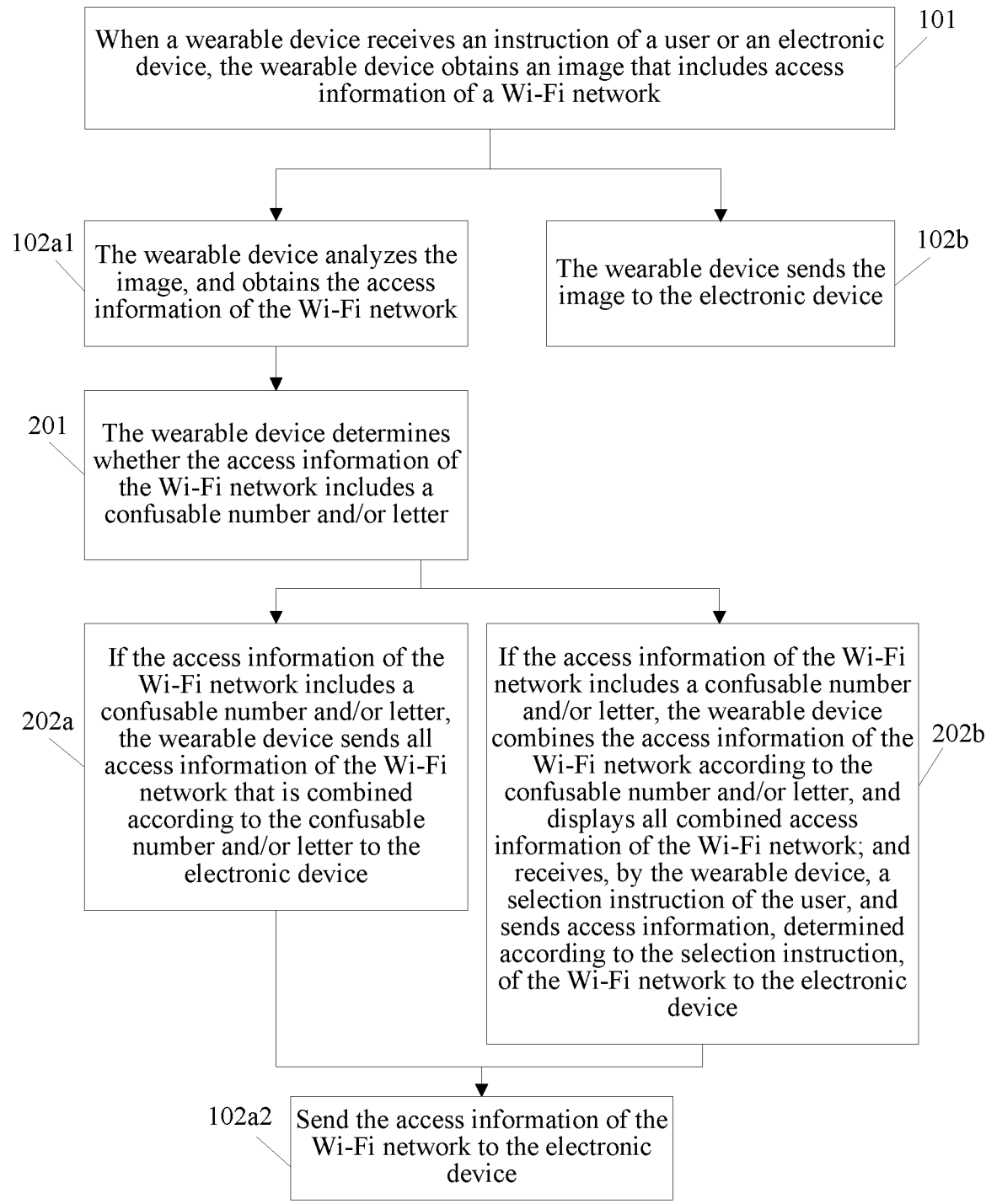
FIG. 2 is a flowchart of another method for accessing a wireless network according to an embodiment of the present invention.

In another embodiment provided in the present invention, a method for increasing accuracy of obtaining the access information of the Wi-Fi network before the wearable device sends the access information of the Wi-Fi network to the electronic device is described in detail. As shown in FIG. 2, the method includes the following steps.

201: The wearable device determines whether the access information of the Wi-Fi network includes a confusable number and/or letter.

During recognition of the Wi-Fi access information, because the Wi-Fi name and the Wi-Fi password often include numbers and English characters, if the Wi-Fi name or the Wi-Fi password includes "1" and "I", "0" and "O", or other confusable characters, accuracy of recognizing the Wi-Fi access information by the wearable device is affected. After it is determined that the Wi-Fi access information includes a confusable number and/or letter, step 302*a* or step 302*b* is performed. 302*a* and 302*b* are parallel technical solutions.

202*a*: If the access information of the Wi-Fi network includes a confusable number and/or letter, the wearable device sends all access information of the Wi-Fi network that is combined according to the confusable number and/or letter to the electronic device.

202*b*: If the access information of the Wi-Fi network includes a confusable number and/or letter, the wearable device combines the access information of the Wi-Fi network according to the confusable number and/or letter, and displays all combined access information of the Wi-Fi network; and the wearable device receives a selection instruction of the user, and sends access information, determined according to the selection instruction, of the Wi-Fi network to the electronic device.

Figure 3:
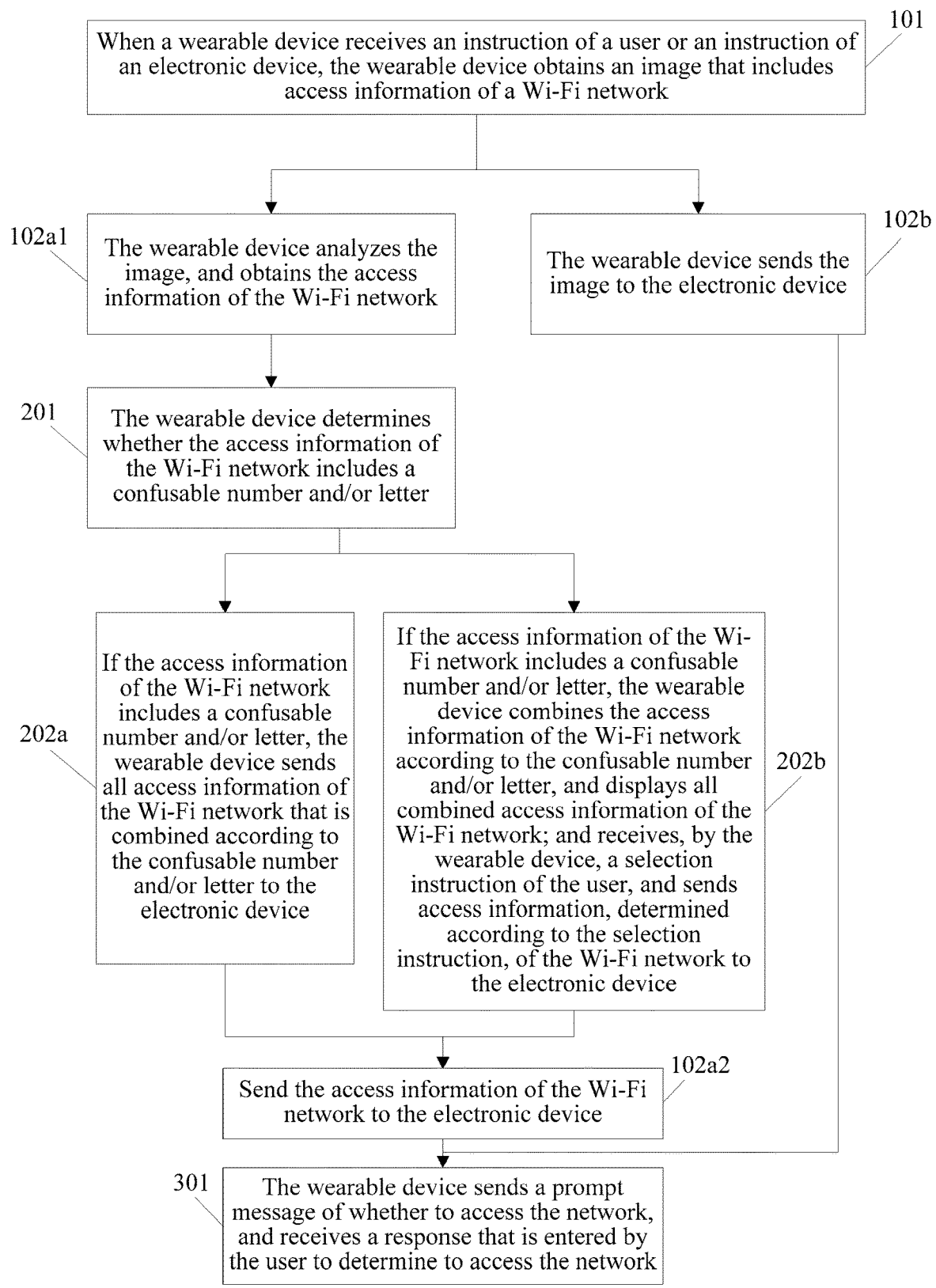
FIG. 3 is a flowchart of another method for accessing a wireless network according to an embodiment of the present invention.

In another embodiment provided in the present invention, before the sending, by the wearable device, the Wi-Fi access information to the electronic device, or before the sending, by the wearable device, the image collected by the image collection apparatus to the electronic device, as shown in FIG. 3, the method includes the following steps.

301: The wearable device sends a prompt message of whether to access the network, and receives a response that is entered by the user to determine to access the network.

A method for prompting the user whether to select to access the network may be that the wearable device prompt messages the user by speech, or the wearable device vibrates to prompt message the user, or the wearable device displays an image to prompt message the user. The foregoing prompting methods are all applicable to the present invention, but the present invention is not limited to the foregoing prompting methods.

In another embodiment provided in the present invention, the instruction of the user is described in detail. The instruction of the user includes any one or more of the following: a specific speech instruction, a specific gesture instruction, input from a specific key, a specific touching manner, a specific head motion, or a specific eye motion.

The specific speech instruction may be collected by using a sound collection apparatus, and a commonly used sound collection apparatus includes a microphone or the like. The specific speech instruction may be a detected utterance "Connect the mobile phone to the network" of the user, or may be another preset speech instruction. When receiving a speech instruction of the user, the wearable device starts to collect an image and configure Wi-Fi access information for the electronic device. The specific gesture instruction may be recognized by using a camera apparatus, and a specific gesture may be an "OK gesture", both a forefinger and a middle finger being raised, a thumb sticking upward, or the like. The input from a specific key may be the press of a physical key or virtual key on the wearable device. The specific touching manner may be detected by using an accelerator or a pressure sensor. The specific touching manner may be a click on the wearable device, a double-click on the wearable device, multiple taps on the wearable device, a swipe on the wearable device, a touch using multiple fingers at the same time on the wearable device, that a time of touching the wearable device reaches a preset time, or the like. The specific head motion may be detected by using an accelerator configured on the wearable device. The wearable device may be worn on a head, and the specific head motion may be a shake of the head or a nod, or the like. The specific eye motion may be detected by using a camera apparatus on the wearable device, for example, smart glasses. The specific eye motion may be multiple quick blinks, closing of eyes, or the like, or may be that a time of gazing at an object exceeds a preset time. The detection of a time of gazing at an object exceeds a preset time may be implemented by detecting an eye motion by using a camera on smart glasses, or may be implemented by detecting images photographed by a camera on smart glasses. If no obvious change occurs in the images within a preset time, it represents that the user is gazing at an object.

It should be noted that, among the wearable devices involved in the foregoing steps, for a smart watch and a smart band, the user may change positions of the foregoing two smart devices to determine an image collection area, and detailed descriptions are not provided in this embodiment. In addition, the following descriptions are provided by using smart glasses as an example.

When the user uses smart glasses to obtain Wi-Fi access information in an image collection area, the smart glasses determine the image collection area by detecting a line of sight of the user. The image collection area is also a vision area position of the user. The vision position area of the user may be determined by using a pupil-cornea reflection vector method, and an implementation manner is as follows:

An infrared auxiliary light source is used to illuminate a human face, and a reflected image is formed on a surface of an eye cornea. This reflected image is referred to as a Purkinje (Purkinje) spot. When a human eye is gazing at different positions, an eye ball rotates correspondingly. Assuming that the head of an observer stays motionless, because a position of an infrared emitting diode is fixed and the eye ball is approximately a sphere, it may be considered that an absolute position of the Purkinje spot stays unchanged when the eye ball moves, but positions of an iris and the pupil correspondingly change. In this way, a relative position relationship among the Purkinje spot, the pupil, and the iris also changes, and this relative position relationship may be determined by means of image processing. Then, a direction of the line of sight may be obtained according to the relative position relationship among the Purkinje spot, the pupil, and the iris, and therefore, the vision position area is obtained.

The vision position area of the user may also be detected in another manner, and no limitation is imposed in this embodiment of the present invention. A specific implementation method of the another manner is a technology known by a person skilled in the art, and details are not described herein in the present invention.

It should be further noted that, after detecting that the user gazes at an area for a period of time with a fixed line of light (for example, the smart glasses detect that the user is gazing at an area for more than five seconds), the smart glasses obtain an image of the vision area position by using a camera of the smart glasses, and process the image by using an image recognition technology after the image of the vision area position of the user is obtained.

In another embodiment provided in the present invention, the instruction of the electronic device is described in detail, including:

receiving, by the wearable device, an instruction that includes the Wi-Fi name and that is sent by the electronic device.

When the wearable device receives the instruction that includes the Wi-Fi name and that is sent by the electronic device, the wearable device obtains, according to the Wi-Fi name, the image that includes the access information of the Wi-Fi network.

Optionally, the wearable device receives an instruction that does not include the Wi-Fi name and that is sent by the electronic device.

When the wearable device receives the instruction that does not include the Wi-Fi name and that is sent by the electronic device, the wearable device obtains the image that includes the access information of the Wi-Fi network.

It should be noted that, when the instruction of the electronic device received by the wearable device does not include the Wi-Fi name, the wearable device recognizes the Wi-Fi access information by using marks such as "Wi-Fi", "password", "name", "SSID", and "password (password)". Alternatively, recognition may be performed according to a characteristic that the Wi-Fi password generally includes multiple numbers, multiple letters, or multiple numbers and letters. When an image collection area includes an image having the foregoing characteristic, image recognition is performed on the image, and a character string is obtained from the image. In this case, the character string is probably a Wi-Fi password. If the character string is a Wi-Fi password, a name of a current area is determined by using the indoor positioning technology.

According to the method for accessing a wireless network provided in this embodiment of the present invention, first, a wearable device obtains an image that includes access information of a Wi-Fi network. Then, the wearable device or an electronic device analyzes the image, and obtains the access information of the Wi-Fi network in the image. Finally, the electronic device accesses the corresponding Wi-Fi network according to the access information of the Wi-Fi network. In a method in the prior art, a user needs to manually enter Wi-Fi access information to enable an electronic device to access a Wi-Fi network. By comparison, in the present invention, a wearable device obtains Wi-Fi access information, and an electronic device automatically accesses a wireless network according to the Wi-Fi access information. Therefore, an operation of manually entering Wi-Fi access information by a user to connect an electronic device to a network is removed, and an entering error that occurs when the user enters the Wi-Fi access information is avoided. Consequently, accuracy of entering the Wi-Fi access information is increased.

Figure 4:
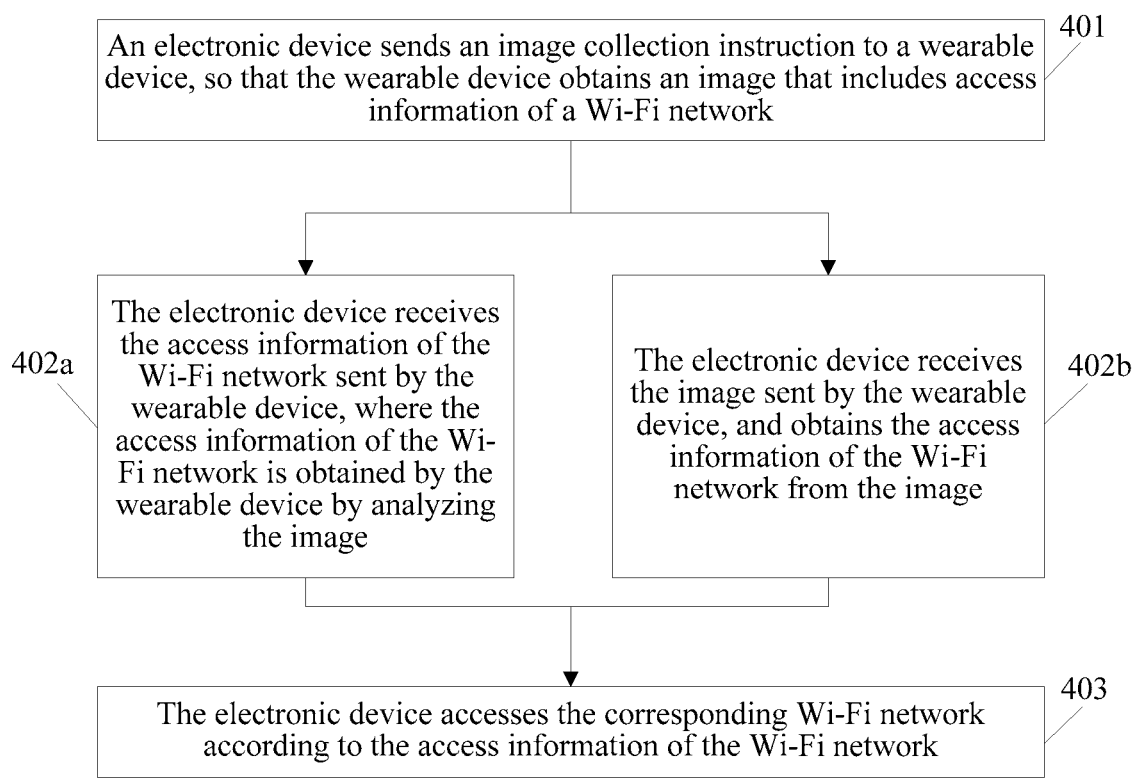
FIG. 4 is a flowchart of another method for accessing a wireless network according to an embodiment of the present invention.

Another embodiment of the present invention provides a method for accessing a Wi-Fi wireless network. As shown in FIG. 4, the method includes the following steps.

401: An electronic device sends an image collection instruction to a wearable device, so that the wearable device obtains an image that includes access information of a Wi-Fi network.

402a: The electronic device receives the access information of the Wi-Fi network sent by the wearable device, where the access information of the Wi-Fi network is obtained by the wearable device by analyzing the image.

402b: The electronic device receives the image sent by the wearable device, and obtains the access information of the Wi-Fi network from the image.

Step 402a and step 402b are two parallel steps. After step 401 is performed, either step 402a or step 402b may be selected to be performed.

403: The electronic device accesses the corresponding Wi-Fi network according to the access information of the Wi-Fi network.

Figure 5:
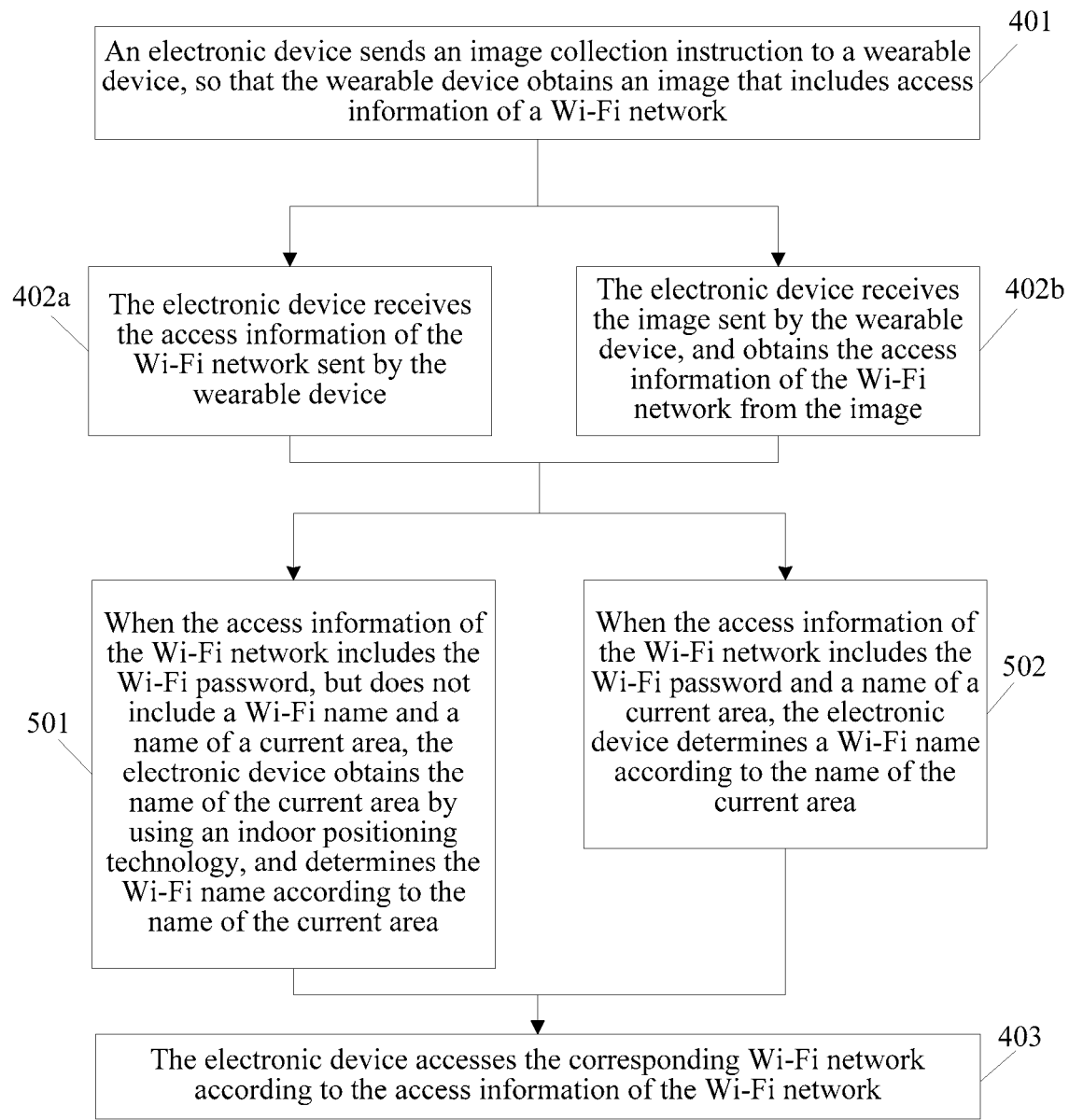
FIG. 5 is a flowchart of another method for accessing a wireless network according to an embodiment of the present invention.

In another embodiment provided in the present invention, a method for accessing a Wi-Fi network according to Wi-Fi access information with different content before the electronic device accesses the corresponding Wi-Fi network according to the access information of the Wi-Fi network is described in detail. As shown in FIG. 5, the method further includes the following steps.

501: When the access information of the Wi-Fi network includes the Wi-Fi password, but does not include a Wi-Fi name and a name of a current area, the electronic device obtains the name of the current area by using an indoor positioning technology, and determines the Wi-Fi name according to the name of the current area.

502: When the access information of the Wi-Fi network includes the Wi-Fi password and a name of a current area, the electronic device determines the Wi-Fi name according to the name of the current area.

The electronic device accesses the corresponding Wi-Fi network according to the Wi-Fi password and the Wi-Fi name.

In another optional implementation manner provided in the present invention, the connecting, by the electronic device, to the corresponding Wi-Fi network according to the access information of the Wi-Fi network includes:

when the electronic device fails to obtain the Wi-Fi name, sequentially attempting, by the electronic device, to access a Wi-Fi network in descending order of signal strength of found Wi-Fi networks, until the electronic device accesses the Wi-Fi network corresponding to the Wi-Fi password.

Figure 6:
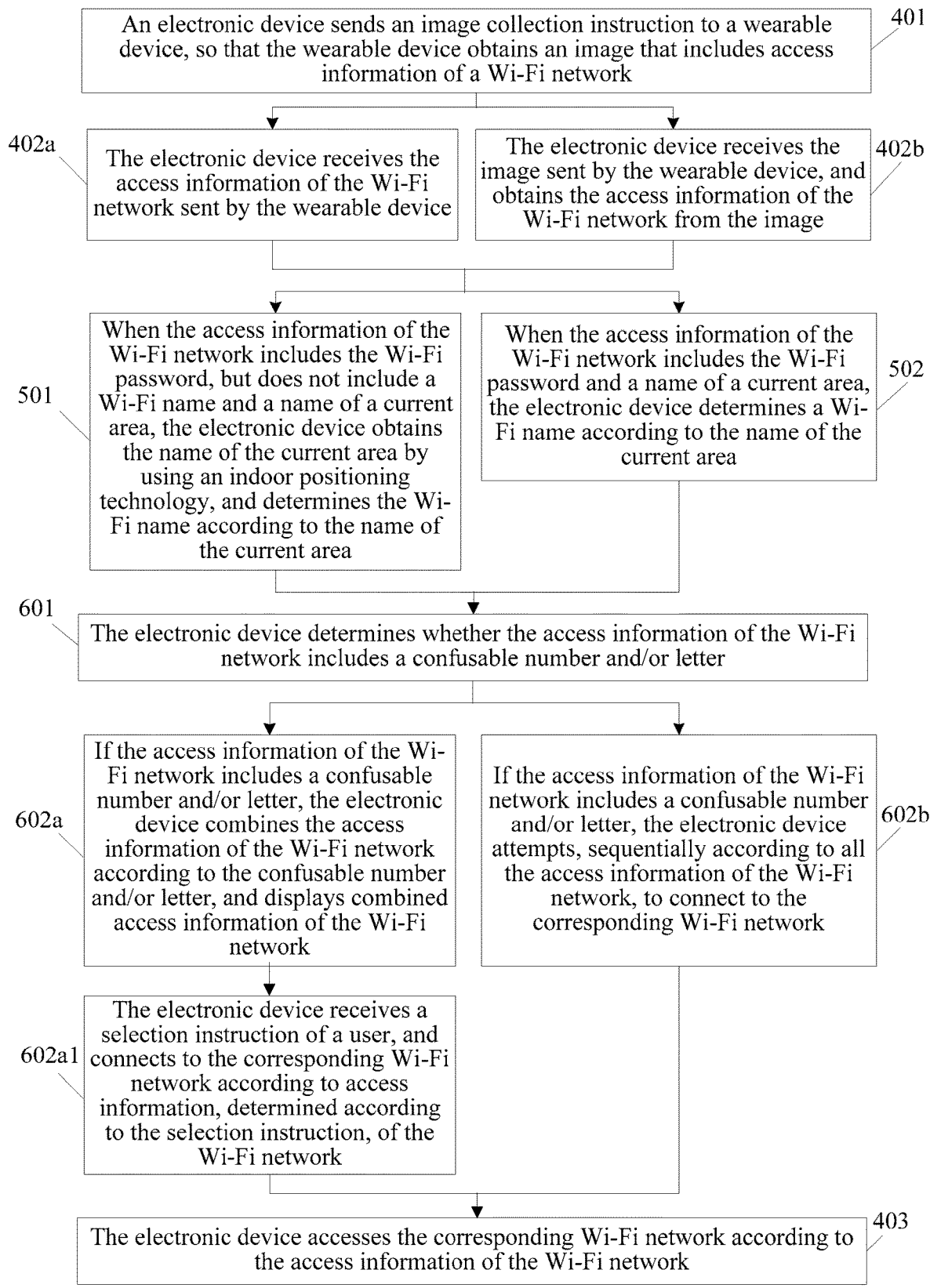
FIG. 6 is a flowchart of another method for accessing a wireless network according to an embodiment of the present invention.

In another optional implementation manner provided in the present invention, a method for increasing accuracy of obtaining the access information of the Wi-Fi network after the electronic device obtains the access information of the Wi-Fi network from the image is described in detail. As shown in FIG. 6, the method further includes the following steps.

601: The electronic device determines whether the access information of the Wi-Fi network includes a confusable number and/or letter.

The connecting, by the electronic device, to the corresponding Wi-Fi network according to the access information of the Wi-Fi network includes the following steps.

602a: If the access information of the Wi-Fi network includes a confusable number and/or letter, the electronic device combines the access information of the Wi-Fi network according to the confusable number and/or letter, and displays combined access information of the Wi-Fi network.

602a1: The electronic device receives a selection instruction of a user, and accesses the corresponding Wi-Fi network according to access information, determined according to the selection instruction, of the Wi-Fi network.

602b: If the access information of the Wi-Fi network includes a confusable number and/or letter, the electronic device attempts, sequentially according to all the access information of the Wi-Fi network, to access the corresponding Wi-Fi network.

In another optional implementation manner provided in the present invention, the sending, by an electronic device, an image collection instruction to a wearable device, so that the wearable device obtains an image that includes access information of a Wi-Fi network specifically includes the following three cases:

In a first case, when finding a Wi-Fi access point, the electronic device sends the image collection instruction to the wearable device, where the image collection instruction includes the Wi-Fi name corresponding to the Wi-Fi access point, so that the wearable device obtains, according to the Wi-Fi name, the image that includes the access information of the Wi-Fi network.

After entering some areas (for example, most chained hotel, cafes, or restaurants), the electronic device finds a Wi-Fi access point of a current area, but does not have a Wi-Fi password to access the Wi-Fi access point. In this case, the electronic device instructs the wearable device to collect an image that includes access information of the Wi-Fi access point and that corresponds to a name of the Wi-Fi access point. Alternatively, when receiving a Wi-Fi access point selected by the user, the electronic device instructs the wearable device to collect an image that includes the Wi-Fi access information and that corresponds to the Wi-Fi access point.

In a second case, when failing to access a saved Wi-Fi access point, the electronic device sends the image collection instruction to the wearable device, where the image collection instruction includes a name of the Wi-Fi access point, so that the wearable device obtains, according to the Wi-Fi name, the image that includes the access information of the Wi-Fi network.

Each time the electronic device establishes a connection to a Wi-Fi access point, the electronic device stores Wi-Fi access information of the Wi-Fi access point. However, when searching for a Wi-Fi access point, the electronic device may find a Wi-Fi access point with a same name. Therefore, when originally saved Wi-Fi access information is used to establish a connection, a connection error may occur. (For example, most chained hotels, cafes, or restaurants usually use a same name as a name of the Wi-Fi access point). In this case, the electronic device instructs the wearable device to collect an image that includes access information of the Wi-Fi access point and that corresponds to a name of the Wi-Fi access point.

In a third case, when receiving an instruction of the user, the electronic device sends the image collection instruction to the wearable device, so that the wearable device obtains the image that includes the access information of the Wi-Fi network.

In another embodiment provided in the present invention, the instruction of the user in the third case is described in detail.

The instruction of the user includes any one or more of the following: a specific speech instruction, a specific gesture instruction, input from a specific key, a specific touching manner, and shaking of the electronic device.

The specific speech instruction may be collected by using a sound collection apparatus, and a commonly used sound collection apparatus includes a microphone or the like. The specific speech instruction may be a detected utterance "Connect the mobile phone to the network" of the user, or may be another preset speech instruction. When receiving a speech instruction of the user, the electronic device sends an image collection instruction to the wearable device. A specific gesture may be recognized by using a camera apparatus, and a specific gesture may be an "OK gesture", both a forefinger and a middle finger being raised, a thumb sticking upward, or the like. The specific key may be the press of a physical key or virtual key on the electronic device. The specific touching manner may be detected by using an accelerator or a pressure sensor. The specific touching manner may be a click on the electronic device, a double-click on the electronic device, multiple taps on the electronic device, a swipe on the electronic device, a touch using multiple fingers at the same time on the electronic device, that a time of touching the electronic device reaches a preset time, a tap on the electronic device, a grip of the electronic device, a press on the electronic device, or the like. The shaking of the electronic device is similar to a "shake" function in the prior art, and the electronic device may be triggered by this motion to send the image collection instruction to the wearable device.

Figure 7:
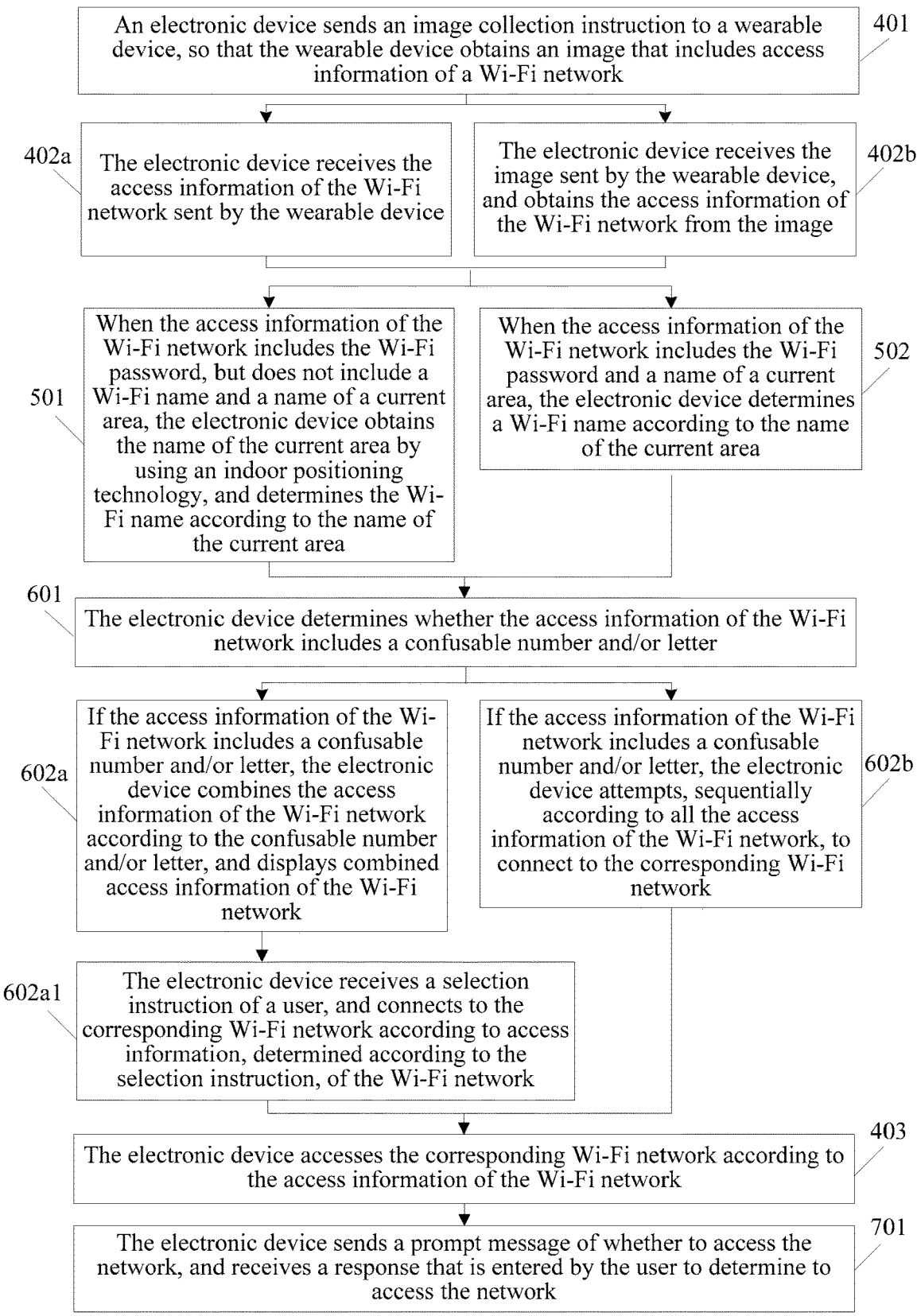
FIG. 7 is a flowchart of another method for accessing a wireless network according to an embodiment of the present invention.

In another embodiment provided in the present invention, before the connecting, by the electronic device, to the corresponding Wi-Fi network according to the access information of the Wi-Fi network, as shown in FIG. 7, the method further includes the following steps.

701: The electronic device sends a prompt message of whether to access the network, and receives a response that is entered by the user to determine to access the network.

A method for prompting the user whether to select to access the network may be that the electronic device prompt messages the user by speech, or the electronic device vibrates to prompt message the user, or the electronic device displays an image to prompt message the user. The foregoing prompting methods are all applicable to the present invention, but the present invention is not limited to the foregoing prompting methods.

Figure 8:
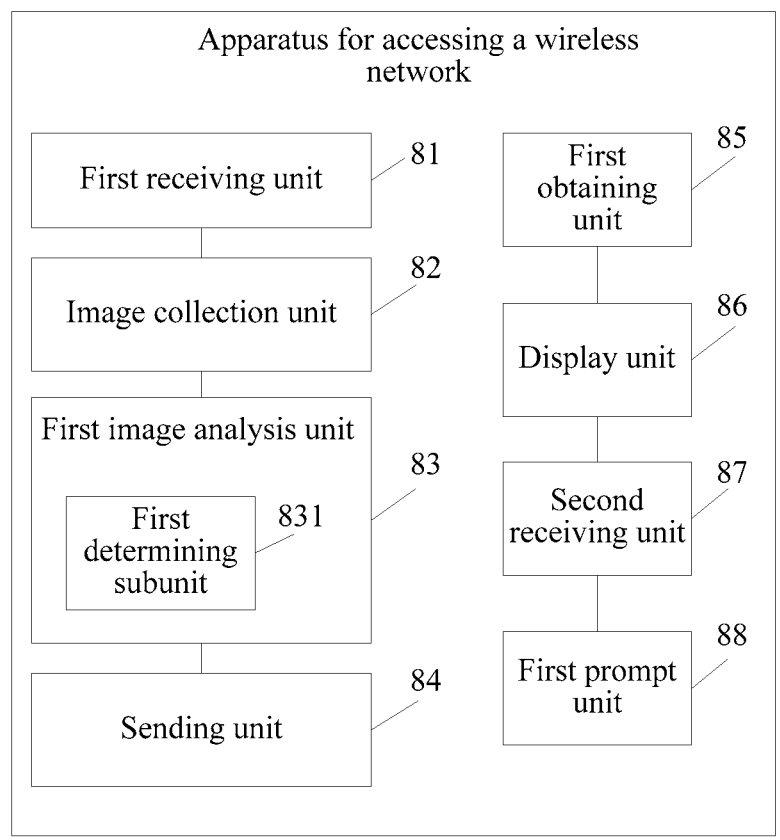
FIG. 8 is a composition block diagram of an apparatus for accessing a wireless network according to an embodiment of the present invention.

According to the method for accessing a wireless network provided in this embodiment of the present invention, first, a wearable device obtains an image that includes access information of a Wi-Fi network. Then, the wearable device or an electronic device analyzes the image, and obtains the access information of the Wi-Fi network in the image. Finally, the electronic device accesses the corresponding Wi-Fi network according to the access information of the Wi-Fi network. In a method in the prior art, a user needs to manually enter Wi-Fi access information to enable an electronic device to access a Wi-Fi network. By comparison, in the present invention, a wearable device obtains Wi-Fi access information, and an electronic device automatically accesses a wireless network according to the Wi-Fi access information. Therefore, an operation of manually entering Wi-Fi access information by a user to connect an electronic device to a network is removed, and an entering error that occurs when the user enters the Wi-Fi access information is avoided. Consequently, accuracy of entering the Wi-Fi access information is increased. An embodiment of the present invention provides an apparatus for accessing a Wi-Fi network. As shown in FIG. 8, the apparatus includes: a first receiving unit 81, an image collection unit 82, a first image analysis unit 83, and a sending unit 84.

The first receiving unit 81 is configured to receive an instruction of a user or an electronic device.

The image collection unit 82 is configured to: after the first receiving unit receives the instruction of the user or the instruction of the electronic device, obtain an image that includes access information of the Wi-Fi network.

The first image analysis unit 83 is configured to: analyze the image obtained by the image collection unit, and obtain the access information of the Wi-Fi network.

The sending unit 84 is configured to send the access information of the Wi-Fi network to the electronic device, so that the electronic device accesses the corresponding Wi-Fi network according to the access information of the Wi-Fi network; or configured to send the image to the electronic device, so that the electronic device accesses the corresponding Wi-Fi network according to the image.

In another embodiment provided in the present invention, the access information of the Wi-Fi network includes a Wi-Fi password; or the access information of the Wi-Fi network includes the Wi-Fi password and a name of a current area; or the access information of the Wi-Fi network includes the Wi-Fi password and a Wi-Fi name.

In another embodiment provided in the present invention, as shown in FIG. 8, the apparatus further includes: a first obtaining unit 85.

The first obtaining unit 85 is configured to: when the access information of the Wi-Fi network includes the Wi-Fi password, but does not include the Wi-Fi name and the name of the current area, obtain the name of the current area by using an indoor positioning technology.

In another optional composition manner of the apparatus provided in the present invention, as shown in FIG. 8, the first image analysis unit 83 further includes: a first determining subunit 831.

The first determining subunit 831 is configured to determine whether the access information of the Wi-Fi network includes a confusable number and/or letter.

The sending unit 84 is specifically configured to: if the access information of the Wi-Fi network includes a confusable number and/or letter, send all access information of the Wi-Fi network that is combined according to the confusable number and/or letter to the electronic device.

In another optional composition manner of the apparatus provided in the present invention, as shown in FIG. 8, the first image analysis unit 83 further includes: a first determining subunit 831, configured to determine whether the access information of the Wi-Fi network includes a confusable number and/or letter.

The apparatus further includes: a display unit 86 and a second receiving unit 87.

The display unit 86 is configured to: if the access information of the Wi-Fi network includes a confusable number and/or letter, combine the access information of the Wi-Fi network according to the confusable number and/or letter, and display all combined access information of the Wi-Fi network.

The second receiving unit 87 is configured to receive a selection instruction of the user.

The sending unit 84 is specifically configured to send access information, determined according to the selection instruction received by the instruction receiving subunit, of the Wi-Fi network to the electronic device.

In another optional composition manner of the apparatus provided in the present invention, as shown in FIG. 8, the apparatus further includes: a first prompt message unit 88.

The first prompt message unit 88 is configured to: before the sending unit 84 sends the Wi-Fi access information or sends the collected image, send a prompt message of whether to access the network, and receive a response that is entered by the user to determine to access the network.

In another optional composition manner of the apparatus provided in the present invention, as shown in FIG. 8, the first receiving unit 81 is specifically configured to receive an instruction that includes the Wi-Fi name and that is sent by the electronic device; and the image collection unit 81 is specifically configured to obtain, according to the Wi-Fi name, the image that includes the access information of the Wi-Fi network.

In another optional composition manner of the apparatus provided in the present invention, as shown in FIG. 8, the first receiving unit 81 is specifically configured to receive, by the wearable device, an instruction that does not include the Wi-Fi name and that is sent by the electronic device; and the image collection unit 82 is specifically configured to obtain the image that includes the access information of the Wi-Fi network.

According to the apparatus for accessing a wireless network provided in this embodiment of the present invention, first, a wearable device obtains an image that includes access information of a Wi-Fi network. Then, the wearable device or an electronic device analyzes the image, and obtains the access information of the Wi-Fi network in the image. Finally, the electronic device accesses the corresponding Wi-Fi network according to the access information of the Wi-Fi network. In a method in the prior art, a user needs to manually enter Wi-Fi access information to enable an electronic device to access a Wi-Fi network. By comparison, in the present invention, a wearable device obtains Wi-Fi access information, and an electronic device automatically accesses a wireless network according to the Wi-Fi access information. Therefore, an operation of manually entering Wi-Fi access information by a user to connect an electronic device to a network is removed, and an entering error that occurs when the user enters the Wi-Fi access information is avoided. Consequently, accuracy of entering the Wi-Fi access information is increased.

Figure 9:
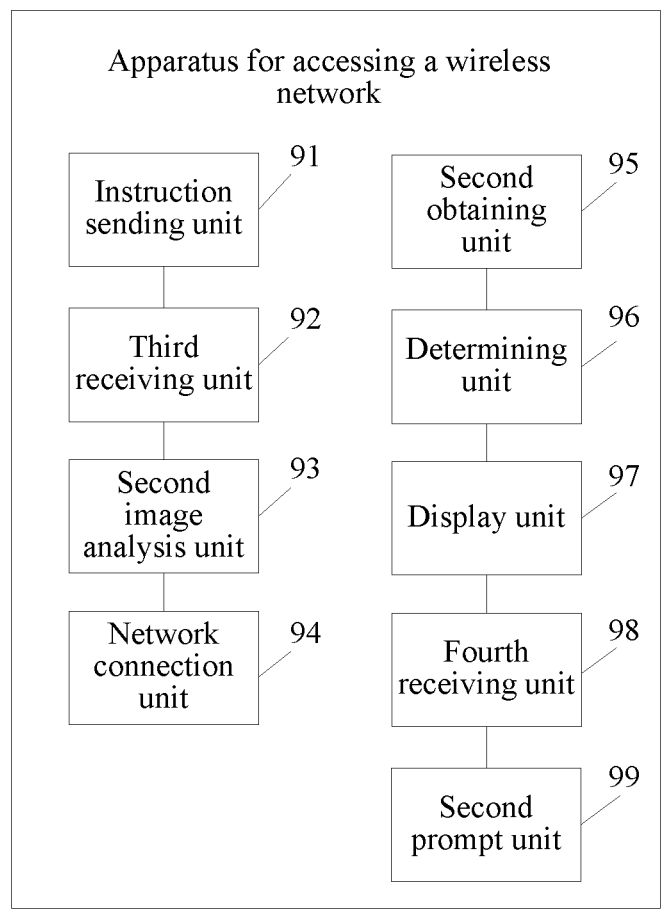
FIG. 9 is a composition block diagram of an apparatus for accessing a wireless network according to an embodiment of the present invention.

An embodiment of the present invention provides an apparatus for accessing a Wi-Fi network. As shown in FIG. 9, the apparatus includes: an instruction sending unit 91, a third receiving unit 92, a second image analysis unit 93, and a network connection unit 94.

The instruction sending unit 91 is configured to send an image collection instruction to a wearable device, so that the wearable device obtains an image that includes access information of a Wi-Fi network.

The third receiving unit 92 is configured to receive the access information of the Wi-Fi network sent by the wearable device, where the access information of the Wi-Fi network is obtained by the wearable device by analyzing the image; or configured to receive the image sent by the wearable device.

The second image analysis unit 93 is configured to obtain the access information of the Wi-Fi network from the image received by the receiving unit.

The network connection unit 94 is configured to access the corresponding Wi-Fi network according to the access information of the Wi-Fi network.

In another optional composition manner of the apparatus provided in the present invention, as shown in FIG. 9, the apparatus further includes: a second obtaining unit 95.

The second obtaining unit 95 is configured to: when the access information of the Wi-Fi network includes the Wi-Fi password, but does not include a Wi-Fi name and a name of a current area, obtain the name of the current area by using an indoor positioning technology, and determine the Wi-Fi name according to the name of the current area; or when the access information of the Wi-Fi network includes the Wi-Fi password and a name of a current area, determine the Wi-Fi name according to the name of the current area; and the network connection unit is specifically configured to access the corresponding Wi-Fi network according to the Wi-Fi password and the Wi-Fi name.

In another optional composition manner of the apparatus provided in the present invention, as shown in FIG. 9, the network connection unit 94 is specifically configured to: when the receiving unit fails to obtain the Wi-Fi name, sequentially attempt to access a Wi-Fi network in descending order of signal strength of found Wi-Fi networks, until the electronic device accesses the Wi-Fi network corresponding to the Wi-Fi password.

In another optional composition manner of the apparatus provided in the present invention, as shown in FIG. 9, the apparatus further includes: a determining unit 96, a display unit 97, and a fourth receiving unit 98.

The determining unit 96 is configured to determine whether the access information of the Wi-Fi network includes a confusable number and/or letter.

The display unit 97 is configured to: if the access information of the Wi-Fi network includes a confusable number and/or letter, combine the access information of the Wi-Fi network according to the confusable number and/or letter, and display combined access information of the Wi-Fi network.

The fourth receiving unit 98 is configured to receive a selection instruction of a user.

The network connection unit 94 is specifically configured to access the corresponding Wi-Fi network according to access information, determined according to the selection instruction, of the Wi-Fi network.

In another optional composition manner of the apparatus provided in the present invention, as shown in FIG. 9, the apparatus further includes:

the determining unit 96, configured to determine whether the access information of the Wi-Fi network includes a confusable number and/or letter; and the network connection unit 94 is specifically configured to: if the access information of the Wi-Fi network includes a confusable number and/or letter, attempt, sequentially according to all the access information of the Wi-Fi network, to access the corresponding Wi-Fi network.

In another optional composition manner of the apparatus provided in the present invention, as shown in FIG. 9, the instruction sending unit 91 is specifically configured to: when a Wi-Fi access point is found, send the image collection instruction to the wearable device, where the image collection instruction includes the Wi-Fi name corresponding to the Wi-Fi access point, so that the wearable device obtains, according to the Wi-Fi name, the image that includes the access information of the Wi-Fi network; or configured to: when a saved Wi-Fi access point fails to be connected, send the image collection instruction to the wearable device, where the image collection instruction includes a name of the Wi-Fi access point, so that the wearable device obtains, according to the Wi-Fi name, the image that includes the access information of the Wi-Fi network; or configured to: when the electronic device receives an instruction of the user, send the image collection instruction to the wearable device, so that the wearable device obtains the image that includes the access information of the Wi-Fi network.

In another optional composition manner of the apparatus provided in the present invention, as shown in FIG. 9, the apparatus further includes: a second prompt message unit 99.

The second prompt message unit 99 is configured to: before the network connection unit accesses the corresponding Wi-Fi network according to the access information of the Wi-Fi network, send a prompt message of whether to access the network, and receive a response that is entered by the user to determine to access the network.

According to the apparatus for accessing a wireless network provided in this embodiment of the present invention, first, a wearable device obtains an image that includes access information of a Wi-Fi network. Then, the wearable device or an electronic device analyzes the image, and obtains the access information of the Wi-Fi network in the image. Finally, the electronic device accesses the corresponding Wi-Fi network according to the access information of the Wi-Fi network. In a method in the prior art, a user needs to manually enter Wi-Fi access information to enable an electronic device to access a Wi-Fi network. By comparison, in the present invention, a wearable device obtains Wi-Fi access information, and an electronic device automatically accesses a wireless network according to the Wi-Fi access information. Therefore, an operation of manually entering Wi-Fi access information by a user to connect an electronic device to a network is removed, and an entering error that occurs when the user enters the Wi-Fi access information is avoided. Consequently, accuracy of entering the Wi-Fi access information is increased.

Figure 10:
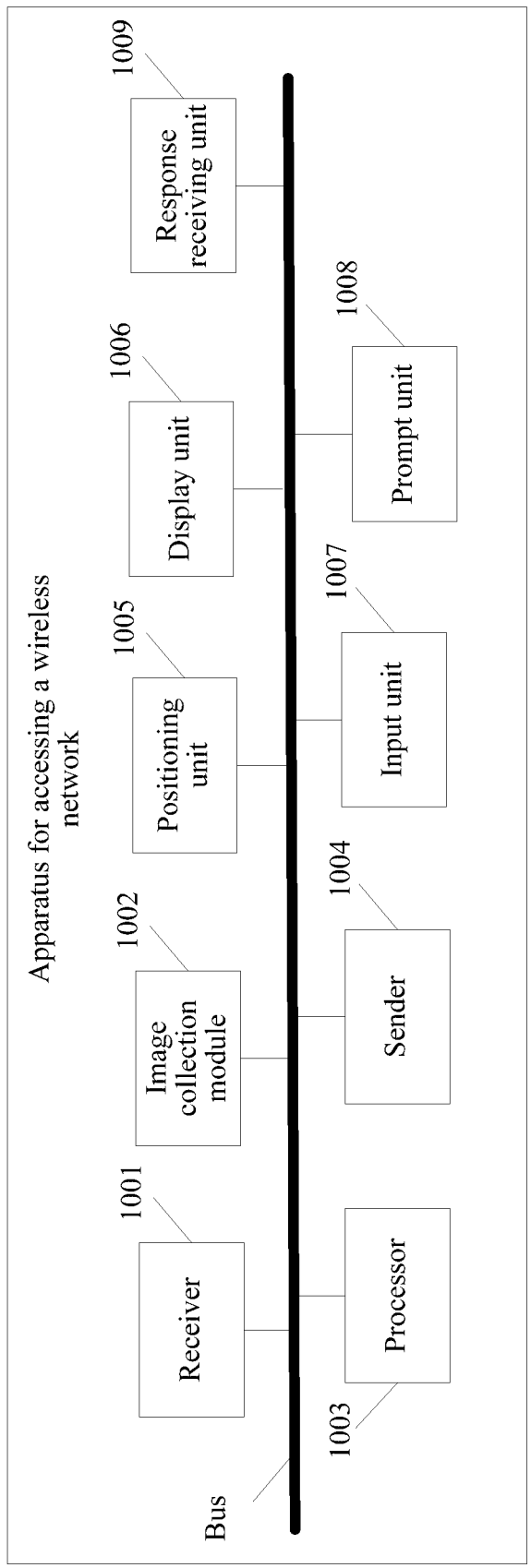
FIG. 10 is a composition block diagram of a wearable device according to an embodiment of the present invention.

An embodiments of the present invention provides a wearable device. As shown in FIG. 10, the wearable device includes: a receiver 1001, an image collection module 1002, a processor 1003, and a sender 1004.

The receiver 1001 is configured to receive an instruction of a user or an electronic device.

Optionally, the receiver receiving the instruction of the user may be a module such as a touch screen, a microphone, or a keyboard.

Optionally, the receiver receiving the instruction of the electronic device may be a Bluetooth module, a Wi-Fi module, or a module of a radio frequency unit.

The image collection module 1002 is configured to: when the receiver receives the instruction of the user or the instruction of the electronic device, obtain an image that includes access information of a Wi-Fi network.

The processor 1003 is configured to: analyze the image, and obtain the access information of the Wi-Fi network.

The sender 1004 is configured to send the access information of the Wi-Fi network to the electronic device, so that the electronic device accesses the corresponding Wi-Fi network according to the access information of the Wi-Fi network; or configured to send the image to the electronic device, so that the electronic device accesses the corresponding Wi-Fi network according to the image.

In another embodiment provided in the present invention, the access information of the Wi-Fi network includes a Wi-Fi password; or
the access information of the Wi-Fi network includes the Wi-Fi password and a name of a current area; or
the access information of the Wi-Fi network includes the Wi-Fi password and a Wi-Fi name.

In another optional composition manner of the wearable device provided in the present invention. As shown in FIG. 10, the wearable device further includes a positioning unit 1005.

The processor 1003 is further configured to: after obtaining the access information of the Wi-Fi network, if the access information of the Wi-Fi network includes the Wi-Fi password, but does not include the Wi-Fi name and the name of the current area, trigger a positioning unit to obtain the name of the current area.

The wearable device further includes the positioning unit 1005, configured to obtain the name of the current area by using an indoor positioning technology according to the triggering of the processor.

In another optional composition manner of the wearable device provided in the present invention, as shown in FIG. 10, the processor is further configured to: before the sender sends the access information of the Wi-Fi network, determine whether the access information of the Wi-Fi network includes a confusable number and/or letter.

The sender 1004 is specifically configured to: if the access information of the Wi-Fi network includes a confusable number and/or letter, send all access information of the Wi-Fi network that is combined according to the confusable number and/or letter to the electronic device.

In another optional composition manner of the wearable device provided in the present invention, as shown in FIG. 10, the processor 1004 is further configured to: before the sender 1004 sends the access information of the Wi-Fi network, determine whether the access information of the Wi-Fi network includes a confusable number and/or letter, and if the access information of the Wi-Fi network includes a confusable number and/or letter, combine the access information of the Wi-Fi network according to the confusable number and/or letter.

As shown in FIG. 10, the wearable device further includes: a display unit 1006 and an input unit 1007.

The display unit 1006 is configured to display all combined access information of the Wi-Fi network.

The input unit 1007 is configured to receive a selection instruction of a user.

The sender 1004 is specifically configured to send access information, determined according to the selection instruction, of the Wi-Fi network to the electronic device.

As shown in FIG. 10, the wearable device further includes: a prompt message unit 1008, configured to: before the sender sends the Wi-Fi access information or sends the collected image, send a prompt message of whether to access the network, where
the prompt message unit 1008 may be a loudspeaker that provides a sound prompt message or a display screen that provides a graphical prompt message; and
a response receiving unit 1009, configured to receive a response that is entered by the user to determine to access the network, where
the response receiving unit 1009 may be a microphone that receives a sound response, or a key unit that receives key input, or a touch screen that receives touch input.

In another optional composition manner of the wearable device provided in the present invention, as shown in FIG. 10,
the receiver 1004 is specifically configured to receive an instruction that includes the Wi-Fi name and that is sent by the electronic device; and
the image collection module 1002 is specifically configured to obtain, according to the Wi-Fi name, the image that includes the access information of the Wi-Fi network.

Optionally, as shown in FIG. 10, the receiver 1001 is specifically configured to receive an instruction that does not specify the Wi-Fi name and that is sent by the electronic device; and the image collection module 1002 is specifically configured to obtain the image that includes the access information of the Wi-Fi network.

According to the wearable device for accessing a wireless network provided in this embodiment of the present invention, first, the wearable device obtains an image that includes access information of a Wi-Fi network. Then, the wearable device or an electronic device analyzes the image, and obtains the access information of the Wi-Fi network in the image. Finally, the electronic device accesses the corresponding Wi-Fi network according to the access information of the Wi-Fi network. In a method in the prior art, a user needs to manually enter Wi-Fi access information to enable an electronic device to access a Wi-Fi network. By comparison, in the present invention, a wearable device obtains Wi-Fi access information, and an electronic device automatically accesses a wireless network according to the Wi-Fi access information. Therefore, an operation of manually entering Wi-Fi access information by a user to connect an electronic device to a network is removed, and an entering error that occurs when the user enters the Wi-Fi access information is avoided. Consequently, accuracy of entering the Wi-Fi access information is increased.

Figure 11:
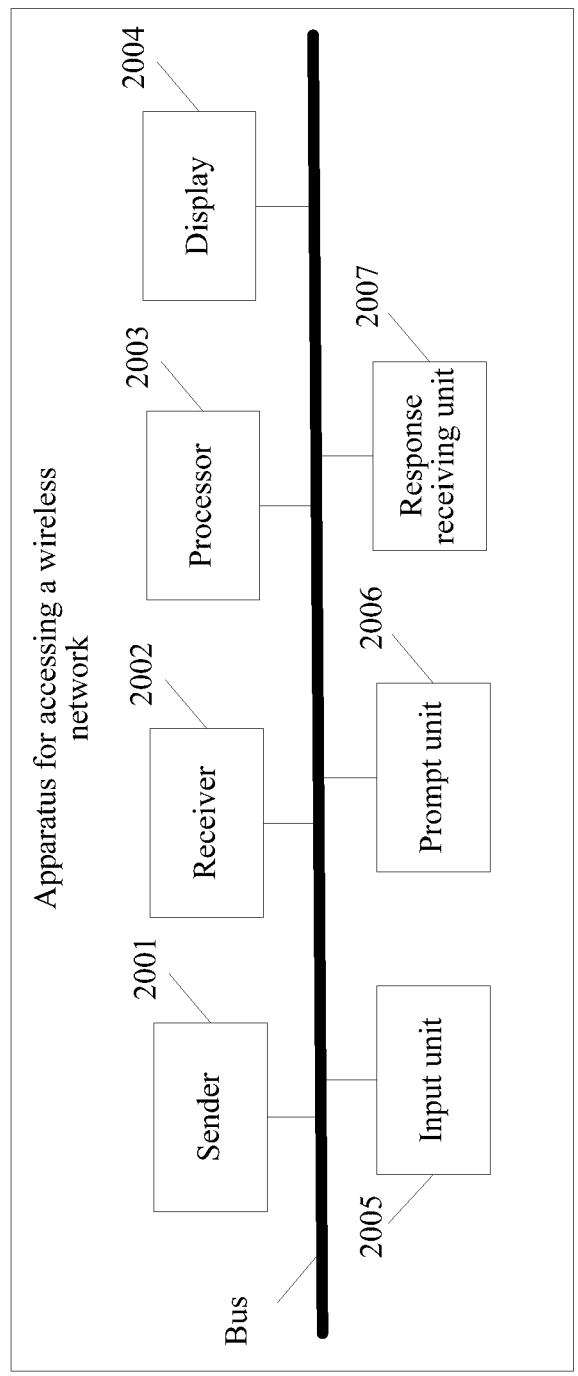
FIG. 11 is a composition block diagram of an electronic device according to an embodiment of the present invention.

An embodiments of the present invention provides an electronic device. As shown in FIG. 11, the electronic device includes: a sender 2001, a receiver 2002, and a processor 2003.

The sender 2001 is configured to send an image collection instruction to a wearable device, so that the wearable device obtains an image that includes access information of a Wi-Fi network.

The receiver 2002 is configured to receive the access information of the Wi-Fi network sent by the wearable device, where the access information of the Wi-Fi network is obtained by the wearable device by analyzing the image; or configured to receive the image sent by the wearable device.

The processor 2003 is configured to obtain the access information of the Wi-Fi network from the image, or obtain the access information of the Wi-Fi network received by the receiver.

The sender 2001 is further configured to access the corresponding Wi-Fi network according to the access information of the Wi-Fi network.

As shown in FIG. 11, before the corresponding Wi-Fi network is connected according to the access information of the Wi-Fi network, the processor 2003 is further configured to: when the access information of the Wi-Fi network includes the Wi-Fi password, but does not include a Wi-Fi name and a name of a current area, obtain the name of the current area by using an indoor positioning technology, and determine the Wi-Fi name according to the name of the current area; or the processor is further configured to: when the access information of the Wi-Fi network includes the Wi-Fi password and a name of a current area, determine the Wi-Fi name according to the name of the current area.

The sender 2001 is specifically configured to access the corresponding Wi-Fi network according to the Wi-Fi password and the Wi-Fi name.

As shown in FIG. 11, the processor 2003 is further configured to: when failing to obtain the Wi-Fi name, obtain signal strength of found Wi-Fi networks.

The sender 2001 is specifically configured to sequentially attempt to access a Wi-Fi network in descending order of the signal strength of the found Wi-Fi networks, until the sender accesses the Wi-Fi network corresponding to the Wi-Fi password.

As shown in FIG. 11, the processor 2003 is further configured to: after obtaining the access information of the Wi-Fi network from the image, or obtaining the access information of the Wi-Fi network received by the receiver, determine whether the access information of the Wi-Fi network includes a confusable number and/or letter, and if the access information of the Wi-Fi network includes a confusable number and/or letter, combine the access information of the Wi-Fi network according to the confusable number and/or letter.

As shown in FIG. 11, the electronic device further includes: a display 2004 and an input unit 2005.

The display 2004 is configured to display combined access information of the Wi-Fi network.

The input unit 2005 is configured to receive a selection instruction of a user.

The sender 2001 is specifically configured to access the corresponding Wi-Fi network according to access information, determined according to the selection instruction, of the Wi-Fi network.

As shown in FIG. 11, the processor 2003 is further configured to: after obtaining the access information of the Wi-Fi network from the image, or obtaining the access information of the Wi-Fi network received by the receiver, determine whether the access information of the Wi-Fi network includes a confusable number and/or letter.

The sender 2001 is specifically configured to: if the access information of the Wi-Fi network includes a confusable number and/or letter, attempt, sequentially according to all the access information of the Wi-Fi network, to access the corresponding Wi-Fi network.

As shown in FIG. 11, the sender 2001 is specifically configured to: when a Wi-Fi access point is found, send the image collection instruction to the wearable device, where the image collection instruction includes the Wi-Fi name corresponding to the Wi-Fi access point, so that the wearable device obtains, according to the Wi-Fi name, the image that includes the access information of the Wi-Fi network; or the sender is specifically configured to: when a saved Wi-Fi access point fails to be connected, send the image collection instruction to the wearable device, where the image collection instruction includes a name of the Wi-Fi access point, so that the wearable device obtains, according to the Wi-Fi name, the image that includes the access information of the Wi-Fi network; or the sender is specifically configured to: when an instruction of the user is received, send the image collection instruction to the wearable device, so that the wearable device obtains the image that includes the access information of the Wi-Fi network.

As shown in FIG. 11, the electronic device further includes:

the electronic device further includes: a prompt message unit 2006, configured to: before the sender accesses the corresponding Wi-Fi network, send a prompt message of whether to access the network, where the prompt message unit 2006 may be a loudspeaker that provides a sound prompt message or a display screen that provides a graphical prompt message; and a response receiving unit 2007, configured to receive a response that is entered by the user to determine to access the network, where the response receiving unit 2007 may be a microphone that receives a sound response, or a key unit that receives key input, or a touch screen that receives touch input.

According to the electronic device provided in this embodiment of the present invention, first, a wearable device obtains an image that includes access information of a Wi-Fi network. Then, the wearable device or the electronic device analyzes the image, and obtains the access information of the Wi-Fi network in the image. Finally, the electronic device accesses the corresponding Wi-Fi network according to the access information of the Wi-Fi network. In a method in the prior art, a user needs to manually enter Wi-Fi access information to enable an electronic device to access a Wi-Fi network. By comparison, in the present invention, a wearable device obtains Wi-Fi access information, and an electronic device automatically accesses a wireless network according to the Wi-Fi access information. Therefore, an operation of manually entering Wi-Fi access information by a user to connect an electronic device to a network is removed, and an entering error that occurs when the user enters the Wi-Fi access information is avoided. Consequently, accuracy of entering the Wi-Fi access information is increased.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for accessing a Wi-Fi network with a wearable device and an electronic device, the wearable device and the electronic device each having a processor and a memory storing computer executable instructions, the method comprising:
   receiving, by the wearable device, an instruction of a user or the electronic device;
   obtaining, by the wearable device, an image that comprises access information of the Wi-Fi network;
   analyzing, by the wearable device, the image to obtain the access information of the Wi-Fi network;
   determining, by the wearable device, whether the access information of the Wi-Fi network comprises a confusable number or letter;
   when the access information of the Wi-Fi network comprises the confusable number or letter, implementing the following operations to increase accuracy of entering Wi-Fi access information:
      combining, by the wearable device, the access information of the Wi-Fi network according to the confusable number or letter, and displaying all combined access information of the Wi-Fi network;
      receiving, by the wearable device, a selection instruction of the user, and sending a first access information of the Wi-Fi network to the electronic device, wherein the first access information of the Wi-Fi network is determined according to the selection instruction; and
      accessing, by the electronic device, the Wi-Fi network according to the first access information of the Wi-Fi network.

2. The method according to claim 1, wherein the access information of the Wi-Fi network comprises one of the following:
   a Wi-Fi password;
   the Wi-Fi password and a name of a current area; and
   the Wi-Fi password and a Wi-Fi name.

3. The method according to claim 1, wherein when the access information of the Wi-Fi network comprises a Wi-Fi password, but does not comprise a Wi-Fi name and a name of the current area, the method further comprises:
   obtaining, by the wearable device, a name of the current area by using an indoor positioning technology.

4. The method according to claim 1, wherein the method further comprises:
   sending, by the wearable device, a prompt message of whether to access the network, and
   receiving a response that is entered by the user to determine to access the network.

5. The method according to claim 1, wherein the instruction of the user comprises one or more of the following: a specific speech instruction, a specific gesture instruction, an input from a specific key, a specific touching manner, a specific head motion, and a specific eye motion.

6. The method according to claim 1,
   wherein the instruction of the electronic device comprises a Wi-Fi name and is sent by the electronic device; and
   wherein the obtaining the image that comprises the access information of the Wi-Fi network comprises obtaining, by the wearable device, according to the Wi-Fi name, the image that comprises the access information of the Wi-Fi network.

7. The method according to claim 1,
   wherein the instruction of the electronic device comprises a Wi-Fi name; and
   wherein obtaining the image that comprises the access information of the Wi-Fi network comprises obtaining, by the wearable device, the image that comprises the access information of the Wi-Fi network.

8. The method of claim 1, wherein the wearable device comprises smart glasses and the electronic device comprises a cell phone.

9. A system for accessing a Wi-Fi network, comprising:
   a wearable device comprising a processor and a memory storing computer executable instructions, the wearable device being configured to obtain an image; and
   an electronic device comprising a processor and a memory storing computer executable instructions, wherein the electronic device is configured to:
      send an image collection instruction to the wearable device to obtain an image that comprises access information of the Wi-Fi network;

receive the access information of the Wi-Fi network sent by the wearable device, wherein the access information of the Wi-Fi network is obtained by the wearable device by analyzing the image;

determine whether the access information of the Wi-Fi network comprises a confusable number or letter after receiving the access information of the Wi-Fi network from the wearable device;

when the access information of the Wi-Fi network comprises a confusable number or letter, implement the following operations to increase accuracy of entering Wi-Fi access information:

combine the access information of the Wi-Fi network according to the confusable number or letter, display combined access information of the Wi-Fi network, receive a selection instruction of a user, and access the Wi-Fi network according to a first access information of the Wi-Fi network which is determined according to the selection information; and access the Wi-Fi network according to the first access information.

10. The system according to claim 9, wherein before the connect to the Wi-Fi network according to the access information of the Wi-Fi network, the electronic device is further configured to:

when the access information of the Wi-Fi network comprises a Wi-Fi password, but does not comprise a Wi-Fi name and a name of a current area, obtain the name of the current area by using an indoor positioning technology, and determine the Wi-Fi name according to the name of the current area;

when the access information of the Wi-Fi network comprises the Wi-Fi password and a name of a current area, determine the Wi-Fi name according to the name of the current area; and wherein the connect to the Wi-Fi network according to the access information of the Wi-Fi network comprises:

connect to the Wi-Fi network according to the Wi-Fi password and the Wi-Fi name.

11. The system according to claim 9, wherein the connect to the Wi-Fi network according to the access information of the Wi-Fi network comprises:

when the electronic device fails to obtain a Wi-Fi name, sequentially attempting, by the electronic device, to access the Wi-Fi network in a descending order of signal strength of found Wi-Fi networks, until the electronic device accesses the Wi-Fi network corresponding to a Wi-Fi password.

12. The system according to claim 9, wherein the send the image collection instruction to the wearable device comprises:

when the electronic device finds a Wi-Fi access point, send, by the electronic device, the image collection instruction to the wearable device, wherein the image collection instruction comprises a Wi-Fi name corresponding to the Wi-Fi access point, so that the wearable device obtains, according to the Wi-Fi name, the image that comprises the access information of the Wi-Fi network; or when the electronic device fails to access a saved Wi-Fi access point, send, by the electronic device, the image collection instruction to the wearable device, wherein the image collection instruction comprises a name of the Wi-Fi access point, so that the wearable device obtains, according to the name of the Wi-Fi access point, the image that comprises the access information of the Wi-Fi network; or when the electronic device receives an instruction of the user, send, by the electronic device, the image collection instruction to the wearable device, so that the wearable device obtains the image that comprises the access information of the Wi-Fi network.

13. The system according to claim 9, wherein the instruction of the user comprises one or more of the following: a specific speech instruction, a specific gesture instruction, an input from a specific key, a specific touching manner, and shaking of the electronic device.

14. The system according to claim 9, wherein before the connecting to the Wi-Fi network according to the access information of the Wi-Fi network, the electronic device is further configured to:

send a prompt message of whether to access the network, and receive a response that is entered by the user to determine to access the network.

15. The system of claim 9, wherein the wearable device comprises smart glasses and the electronic device comprises a cell phone.

16. A wearable device, comprising:

a processor; and a memory storing computer-executable instructions that, when executed by the processor, cause the wearable device to:

receive an instruction of a user or an electronic device;

obtain an image that comprises access information of a Wi-Fi network;

analyze the image, and obtain the access information of the Wi-Fi network;

wherein before the send the access information of the Wi-Fi network, determine whether the access information of the Wi-Fi network comprises a confusable number or letter;

when the access information of the Wi-Fi network comprises the confusable number or letter, implement the following operations to increase accuracy of entering Wi-Fi access information:

combine the access information of the Wi-Fi network according to the confusable number or letter, and display combined access information of the Wi-Fi network, receive a selection instruction of a user, and send a first access information of the Wi-Fi network to the electronic device, wherein the first access information is determined according to the selection information.

17. The wearable device according to claim 16, wherein the access information of the Wi-Fi network comprises one of the following:

a Wi-Fi password;

the Wi-Fi password and a name of a current area; and the Wi-Fi password and a Wi-Fi name.

18. The wearable device according to claim 16, wherein the wearable device is further configured to:

when the access information of the Wi-Fi network comprises a Wi-Fi password, but does not comprise a Wi-Fi name and a name of the current area, trigger a positioning apparatus to obtain the name of the current area; and wherein the wearable device further comprises the positioning apparatus, configured to obtain the name of the current area by using an indoor positioning technology upon being triggered by the processor.

19. The wearable device according to claim 16, wherein the wearable device is further configured to:
when the access information of the Wi-Fi network comprises the confusable number or letter, combine the access information of the Wi-Fi network according to the confusable number or letter;
wherein the wearable device further comprises:
a display, configured to display all combined access information of the Wi-Fi network; and
an input device, configured to receive a selection instruction of the user; and
wherein the wearable device is further configured to send access information, determined according to the selection instruction, of the Wi-Fi network to the electronic device.

20. The wearable device of claim 16, wherein the wearable device comprises smart glasses.

* * * * *